Figure 1:
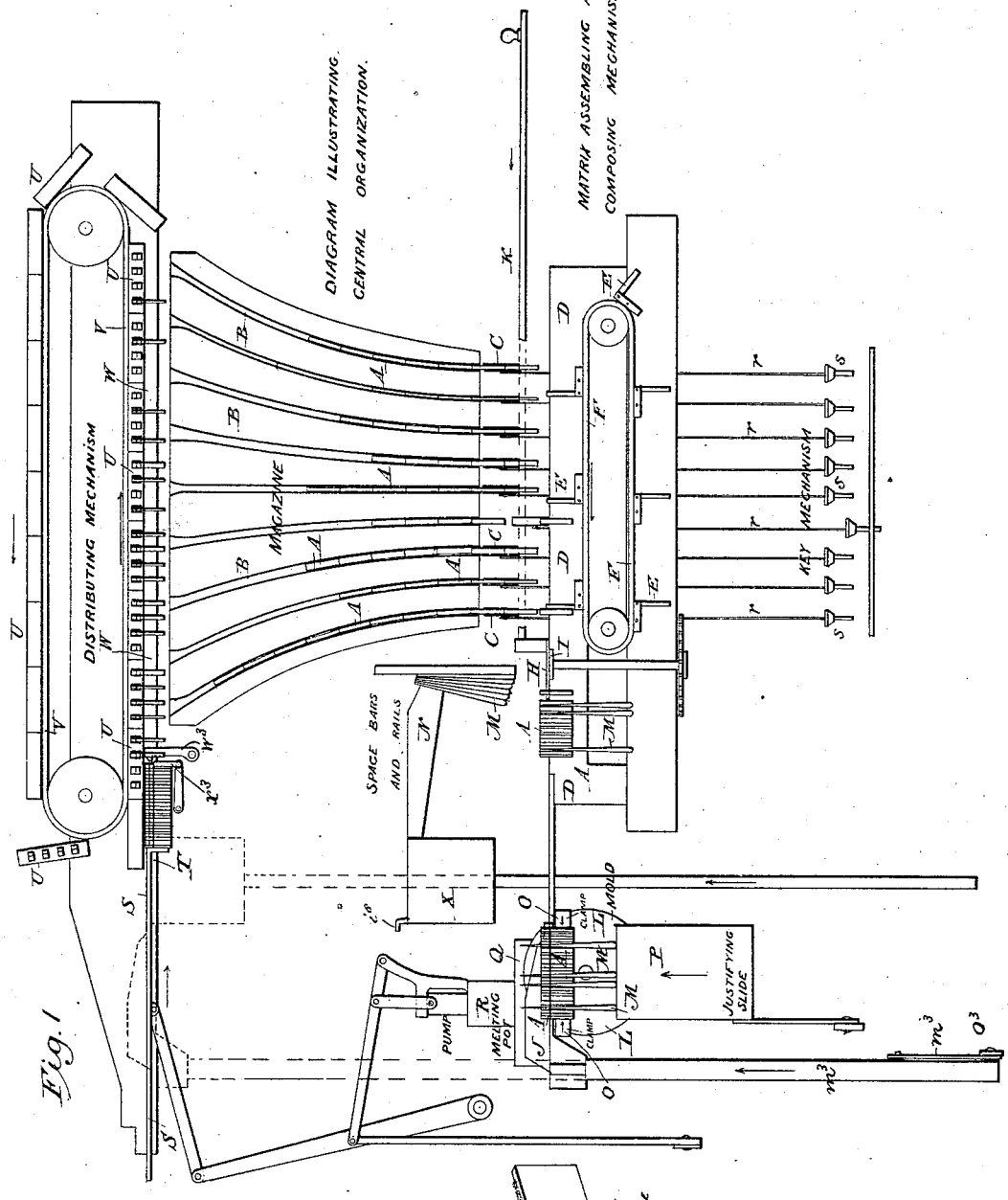

(No Model.) 15 Sheets—Sheet 1.

O. MERGENTHALER.
MACHINE FOR PRODUCING TYPE BARS.

No. 345,526. Patented July 13, 1886.

WITNESSES
Sidney P. Hollingworth
W. H. Shipley

INVENTOR
Ottmar Mergenthaler
By P. T. Dodge atty (No Model.) 15 Sheets—Sheet 2.

O. MERGENTHALER.
MACHINE FOR PRODUCING TYPE BARS.

No. 345,526. Patented July 13, 1886.

WITNESSES
Sidney P. Hollingsworth
W. H. Shipley

INVENTOR
Ottmar Mergenthaler
By P. T. Dodge.
Attorney

N. PETERS, Photo-Lithographer, Washington, D. C.

(No Model.) 15 Sheets—Sheet 3.

O. MERGENTHALER.
MACHINE FOR PRODUCING TYPE BARS.

No. 345,526. Patented July 13, 1886.

WITNESSES
INVENTOR (No Model.) 15 Sheets—Sheet 4.

O. MERGENTHALER.
MACHINE FOR PRODUCING TYPE BARS.

No. 345,526. Patented July 13, 1886.

WITNESSES
Sidney P. Hollingsworth
W. H. Shipley

INVENTOR
Ottmar Mergenthaler
By P. T. Dodge,
Attorney (No Model.)

15 Sheets—Sheet 5.

O. MERGENTHALER.
MACHINE FOR PRODUCING TYPE BARS.

No. 345,526. Patented July 13, 1886.

WITNESSES

INVENTOR
Ottmar Mergenthaler
By P. T. Dodge.
Attorney (No Model.) 15 Sheets—Sheet 6.

O. MERGENTHALER.
MACHINE FOR PRODUCING TYPE BARS.

No. 345,526. Patented July 13, 1886.

on line 2-2

WITNESSES

INVENTOR
Ottmar Mergenthaler
By Phil. T. Dodge.
Attorney (No Model.) 15 Sheets—Sheet 7.
O. MERGENTHALER.
MACHINE FOR PRODUCING TYPE BARS.
No. 345,526. Patented July 13, 1886.
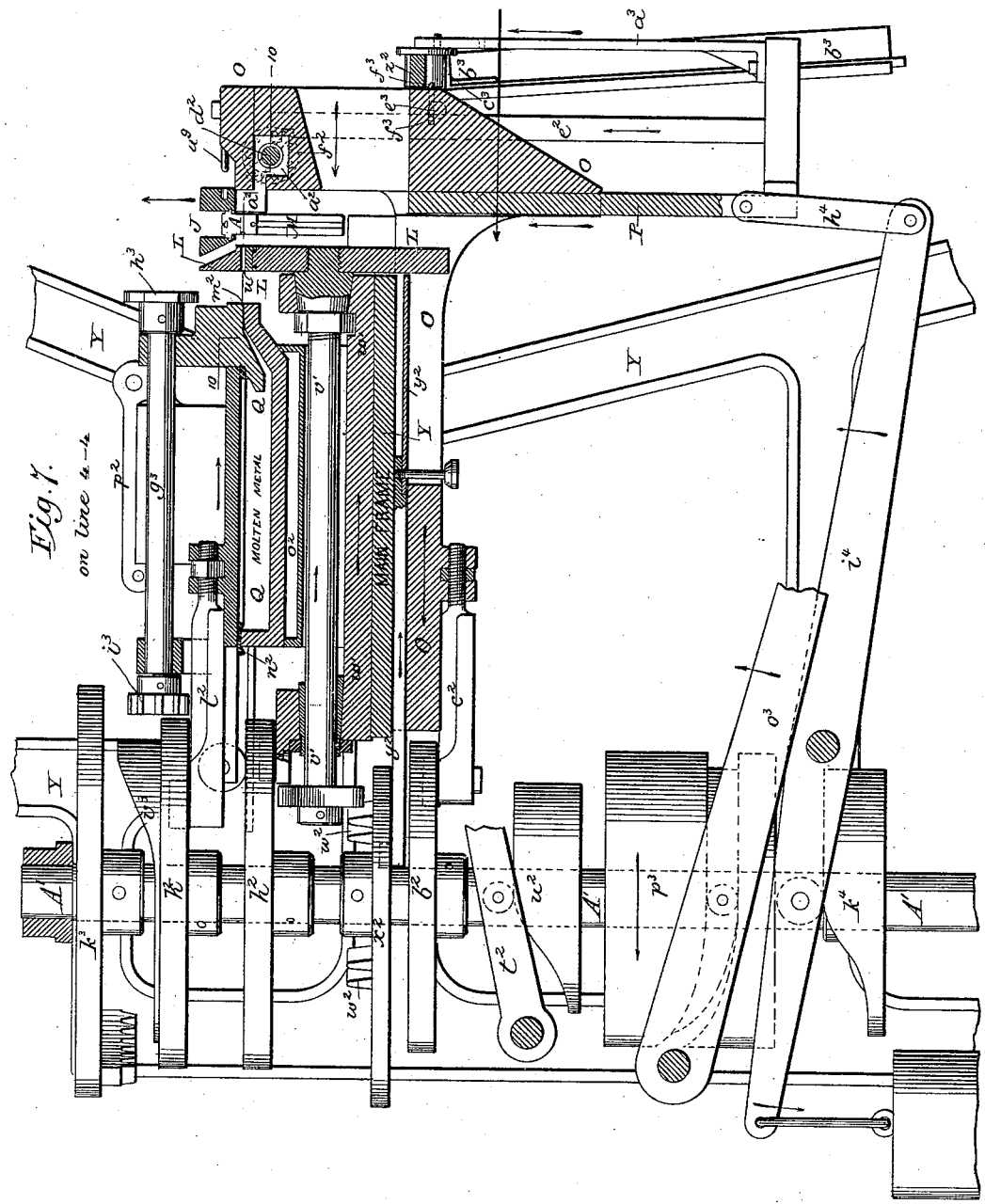
WITNESSES
Sidney P. Hollingsworth
W. H. Shipley
INVENTOR
Ottmar Mergenthaler
By Philip T. Dodge.
Attorney

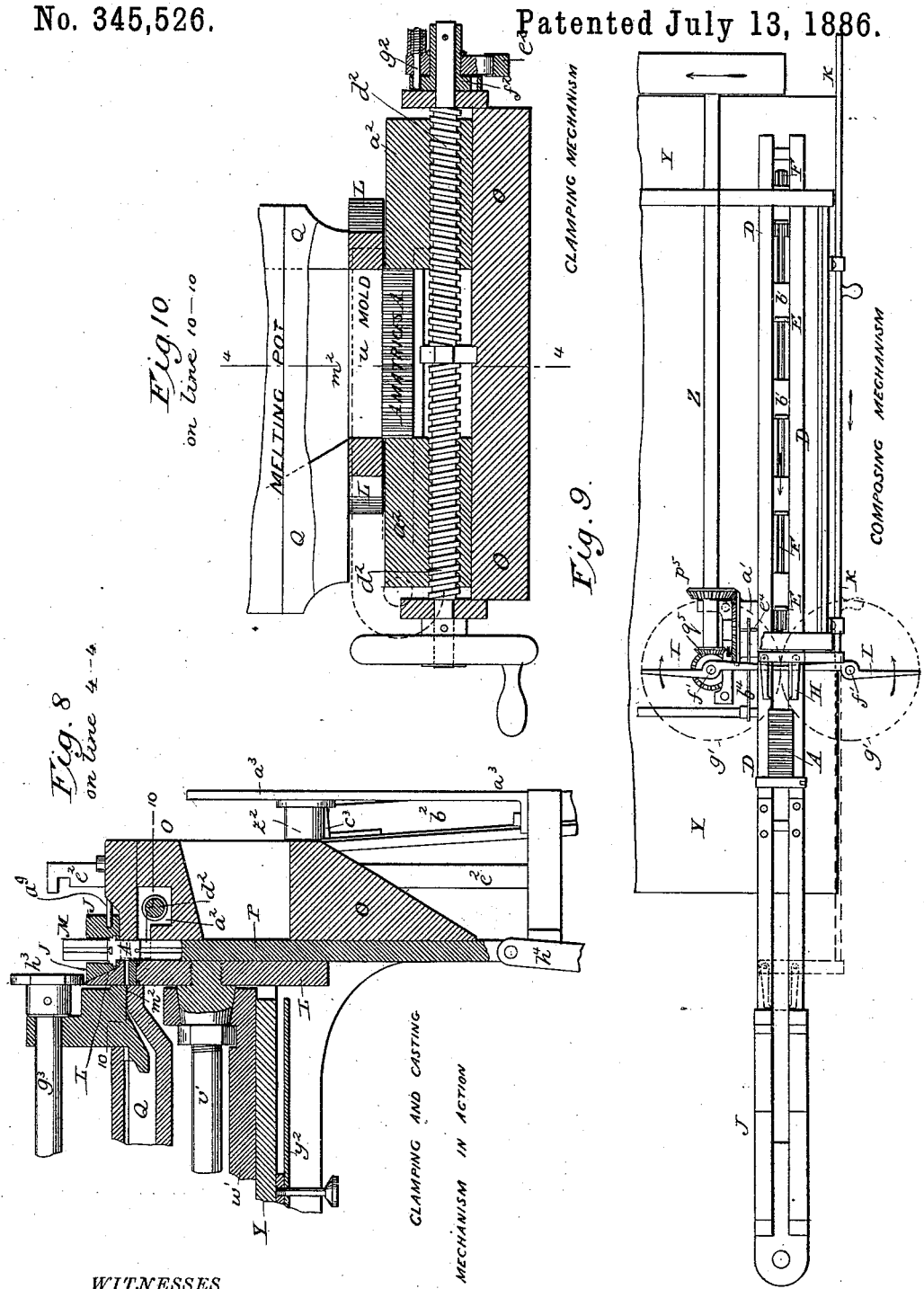

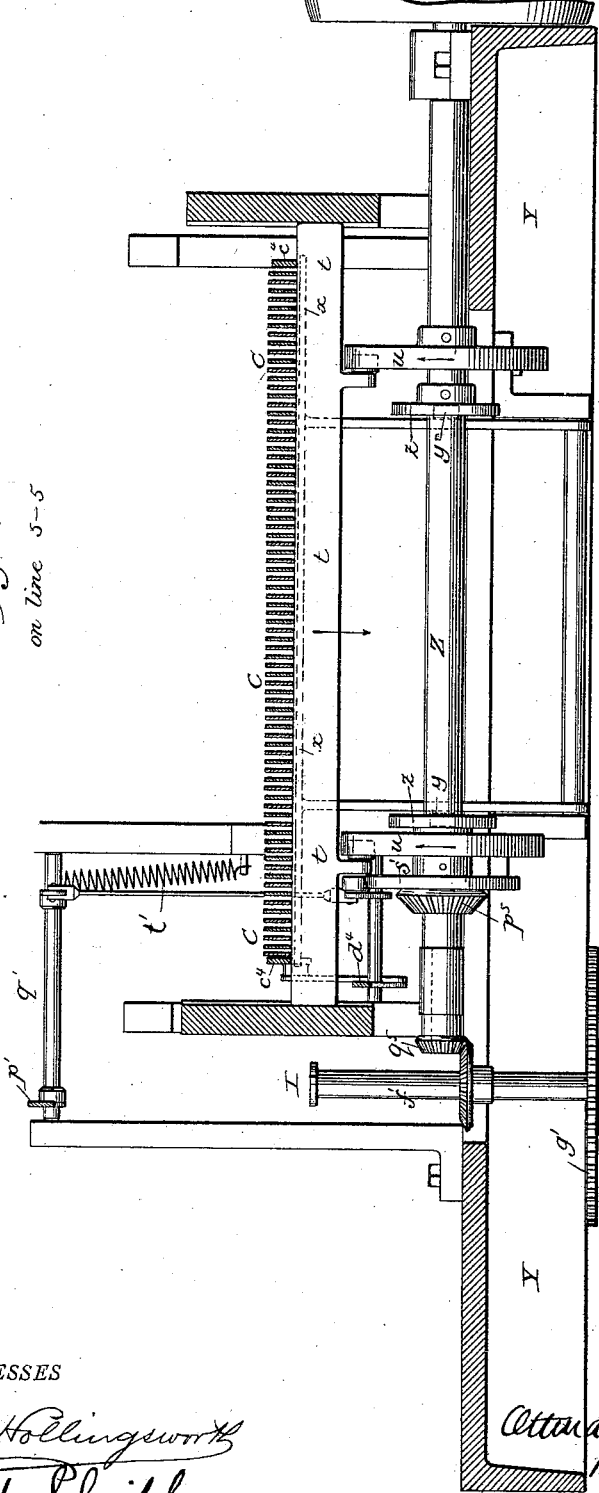

(No Model.) 15 Sheets—Sheet 10.
O. MERGENTHALER.
MACHINE FOR PRODUCING TYPE BARS.
No. 345,526. Patented July 13, 1886.
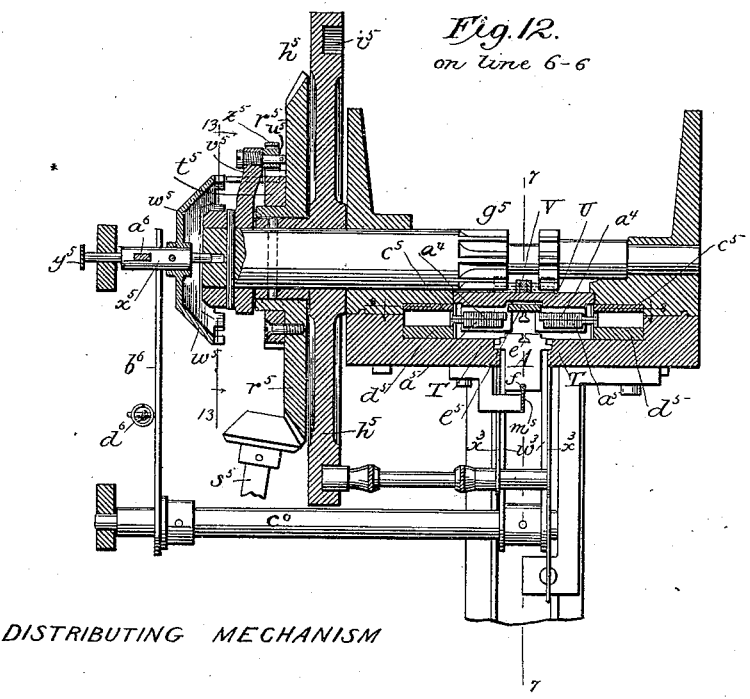
DISTRIBUTING MECHANISM
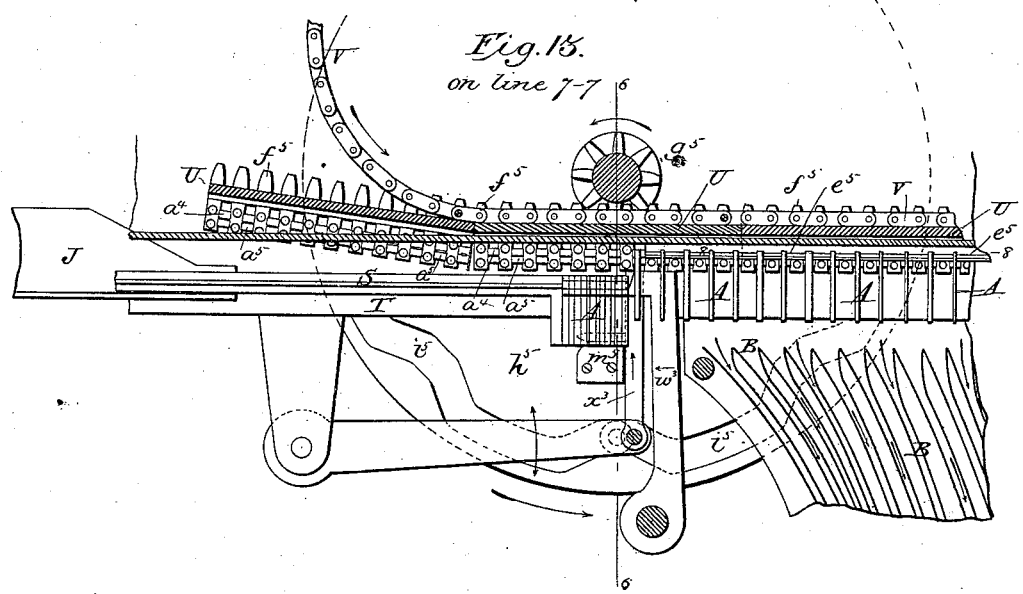
WITNESSES
Sidney P. Hollingsworth
W. H. Shipley
INVENTOR
Ottmar Mergenthaler
By Phil. T. Dodge
Attorney (No Model.) 15 Sheets—Sheet 11.
O. MERGENTHALER.
MACHINE FOR PRODUCING TYPE BARS.
No. 345,526. Patented July 13, 1886.
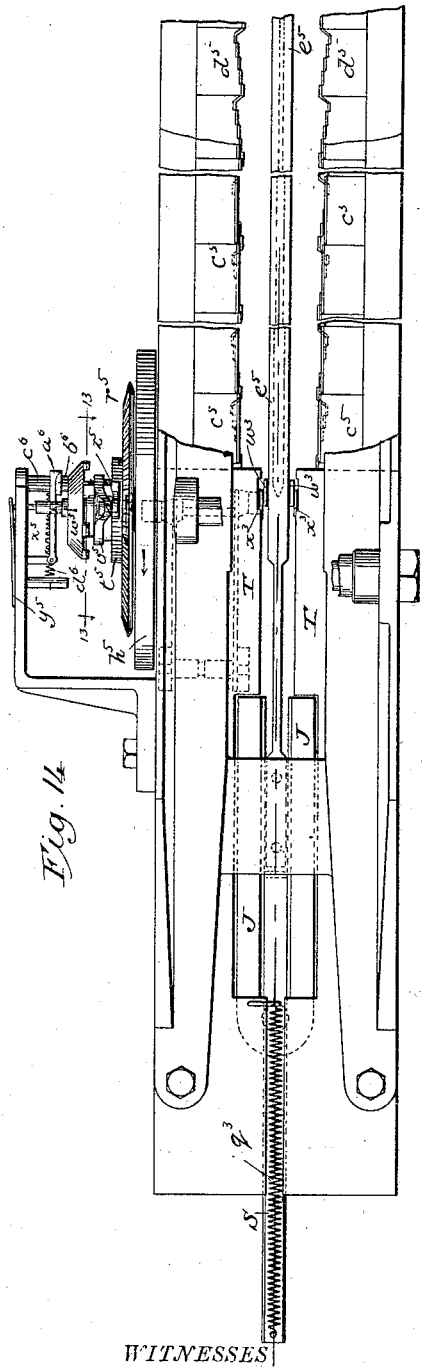
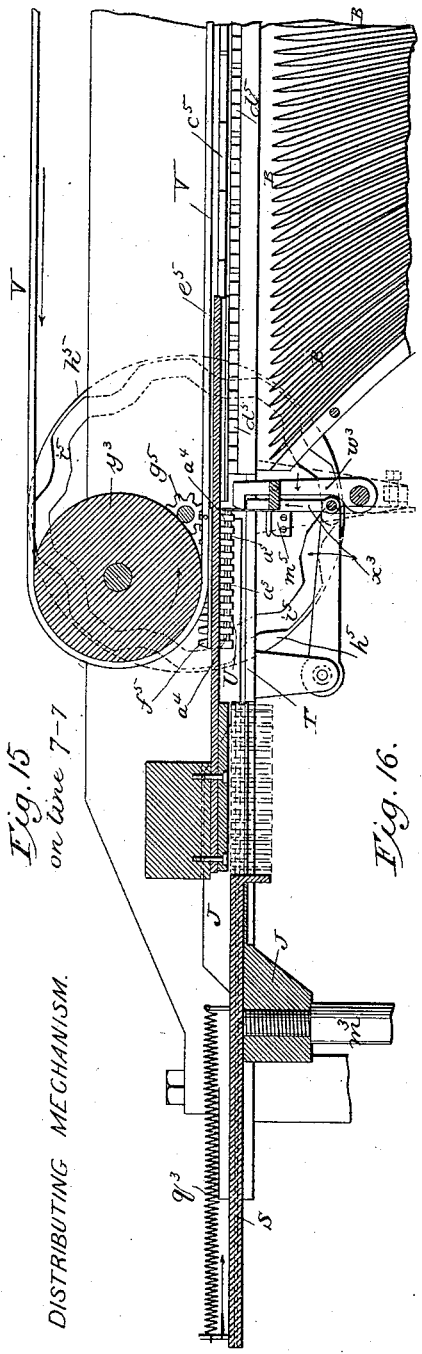
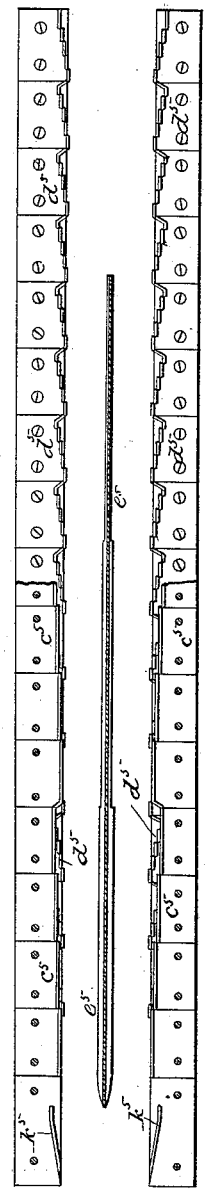
DISTRIBUTING MECHANISM.
WITNESSES
Sidney P. Hollingsworth
W. H. Shipley
INVENTOR
Ottmar Mergenthaler
By Phil. T. Dodge.
Attorney
N. PETERS, Photo-Lithographer, Washington, D. C.

(No Model.) 15 Sheets—Sheet 12.
O. MERGENTHALER.
MACHINE FOR PRODUCING TYPE BARS.
No. 345,526. Patented July 13, 1886.
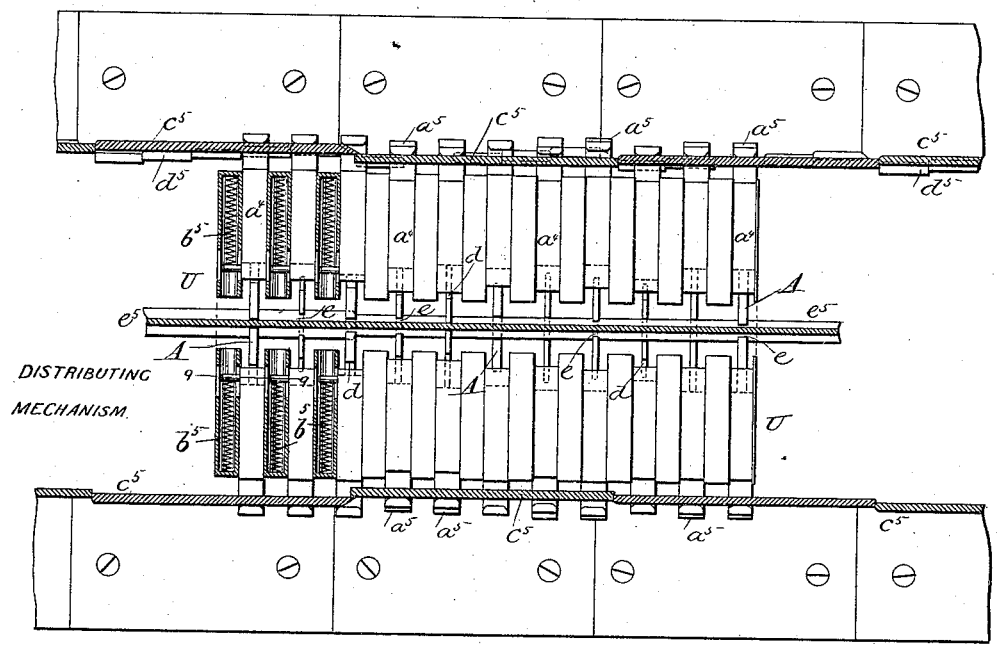
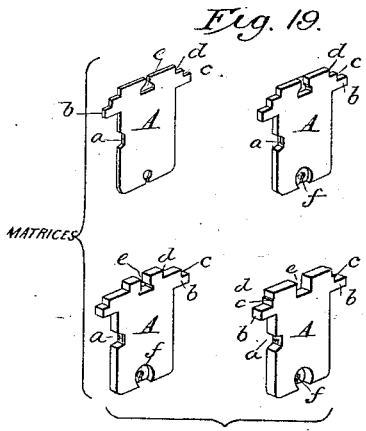
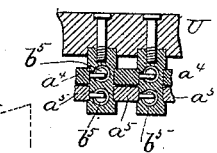
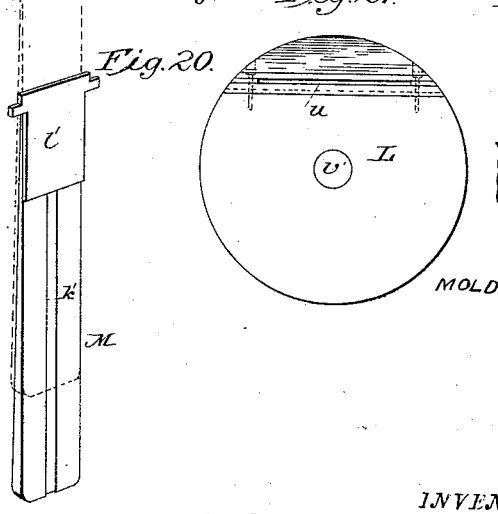
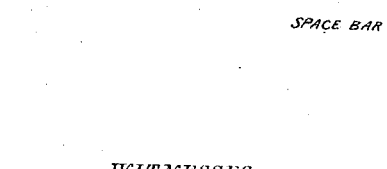
WITNESSES
INVENTOR
Ottmar Mergenthaler
By Philip T. Dodge
Attorney (No Model.) 15 Sheets—Sheet 13.
O. MERGENTHALER.
MACHINE FOR PRODUCING TYPE BARS.
No. 345,526. Patented July 13, 1886.
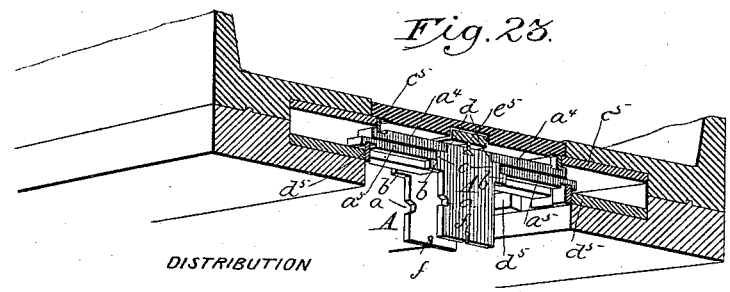
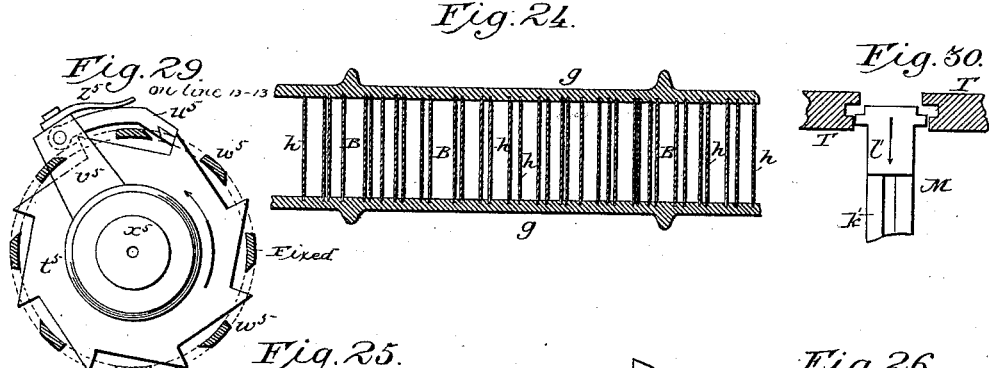
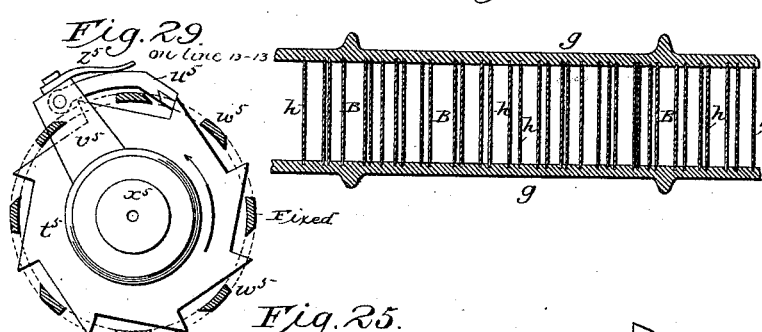
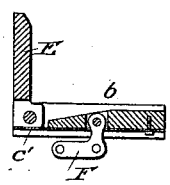
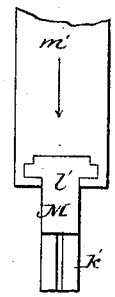
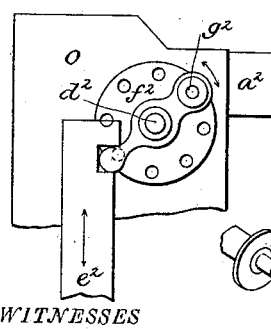
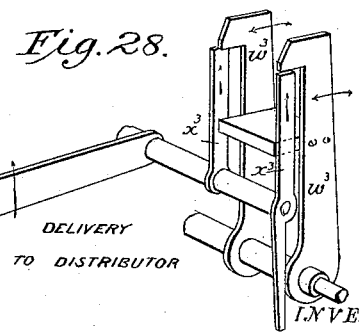
WITNESSES
INVENTOR
Ottmar Mergenthaler
By Philip T. Dodge
Attorney (No Model.) 15 Sheets—Sheet 14.
O. MERGENTHALER.
MACHINE FOR PRODUCING TYPE BARS.
No. 345,526. Patented July 13, 1886.
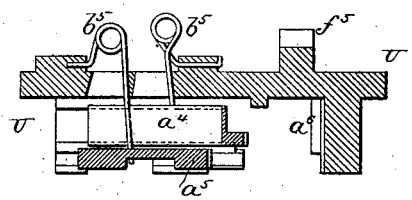
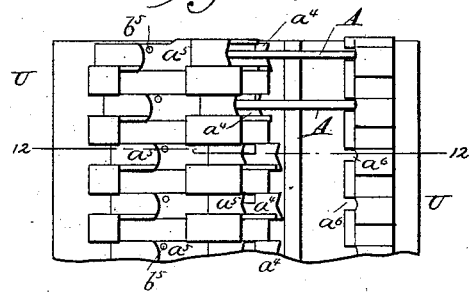
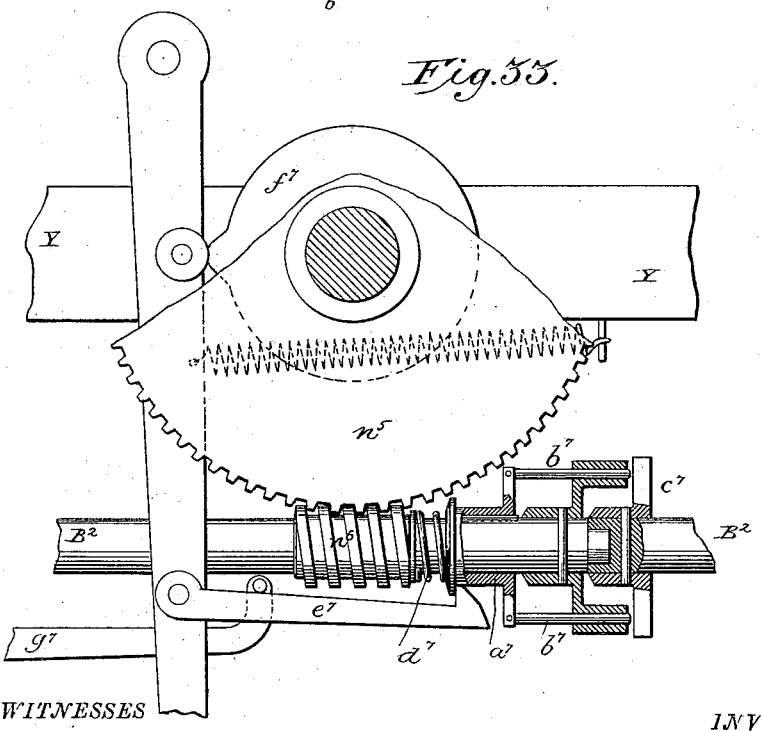
WITNESSES
Sidney P. Hollingworth
W. H. Shipley
INVENTOR
Ottmar Mergenthaler
By Philip T. Dodge
Attorney (No Model.)
O. MERGENTHALER.
MACHINE FOR PRODUCING TYPE BARS.
No. 345,526. Patented July 13, 1886.
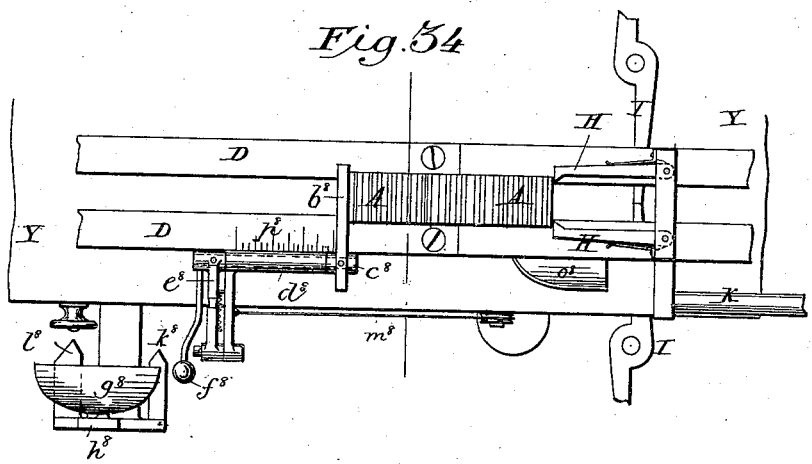
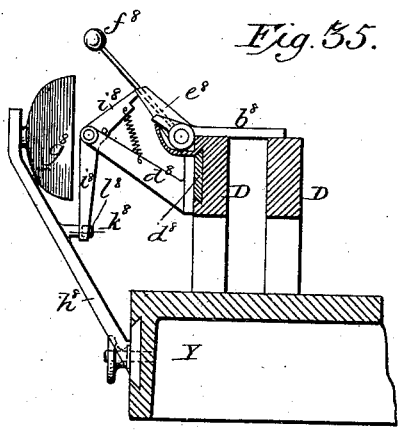
WITNESSES
INVENTOR
Ottmar Mergenthaler
By P. T. Dodge atty

UNITED STATES PATENT OFFICE.

OTTMAR MERGENTHALER, OF BALTIMORE, MARYLAND, ASSIGNOR TO THE NATIONAL TYPOGRAPHIC COMPANY.

MACHINE FOR PRODUCING TYPE-BARS.

SPECIFICATION forming part of Letters Patent No. 345,526, dated July 13, 1886.

Application filed May 11, 1885. Serial No. 165,138. (No model.)

*To all whom it may concern:*

Be it known that I, OTTMAR MERGENTHALER, of Baltimore, in the State of Maryland, have invented certain Improvements in Machines for Producing Type-Bars for Printing Purposes, of which the following is a specification.

This invention relates to a power-driven machine controlled by finger-keys for producing cast-metal bars, each bearing on its edge type representing a line of words, properly justified, the bars being adapted to be assembled side by side to produce a type-form for printing purposes.

The present machine may be regarded as an improvement on the one for which Letters Patent were granted to me on or about the 12th day of May, 1885, and is constructed and arranged to operate on the same general plan. A series of disconnected matrices, representing individual characters, are placed in magazine-tubes and discharged therefrom, one at a time, by devices connected with finger-keys representing the different characters. The matrices are delivered between supporting-rails, over which they are carried by rapidly-traveling fingers on an endless chain, and thus assembled in a group or line. Expansible spacing devices are dropped between the matrices at the proper points by the action of a special finger-key. The assembled line is moved along the rails to a point opposite the face of a mold corresponding in form and size with the desired bar. Clamps advance opposite the two ends of the assembled line of matrices. The series of space-bars are acted upon simultaneously, so as to expand the line of matrices tightly between the clamps, giving the required justification. The matrices are forced against the face of the mold, and the latter supplied by a pump with molten metal, which assumes the form of a bar bearing on its face relief-impressions of the characters in the matrices. The parts are next released, the bar automatically discharged from the mold, and the line of matrices transferred to a distributing mechanism, by which the matrices are returned to their respective tubes and the spacing devices returned to their original place of assemblage.

The invention relates to various details of construction, which will be hereinafter described, but more particularly to the manner of constructing the magazine; to the escapement mechanism for discharging the matrices and transferring them to the guide-rails; to the manner of introducing the spacing devices; to the construction of the casting and clamping mechanism, and to the construction of the distributing mechanism.

Figure 2:
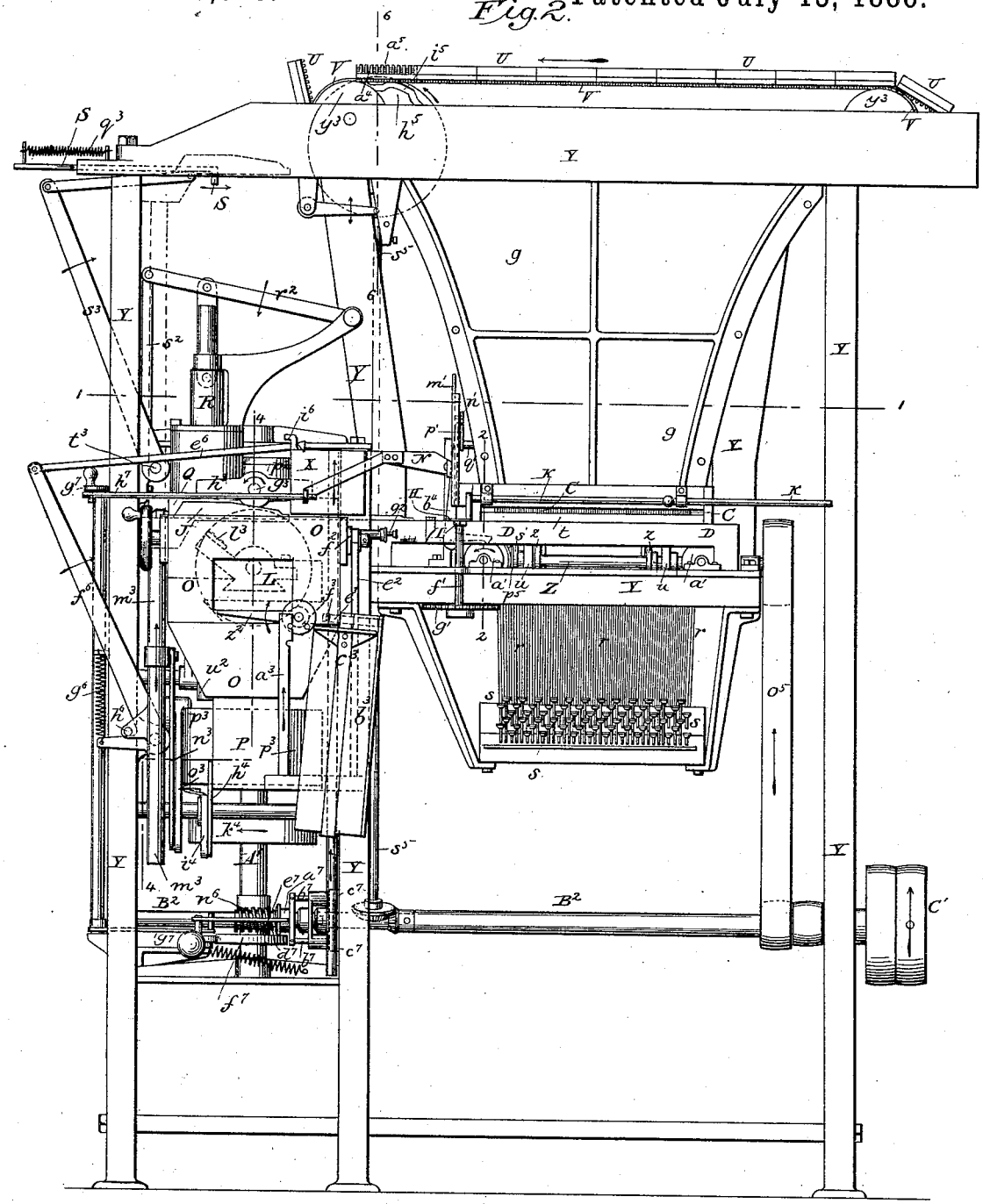
Figure 3:
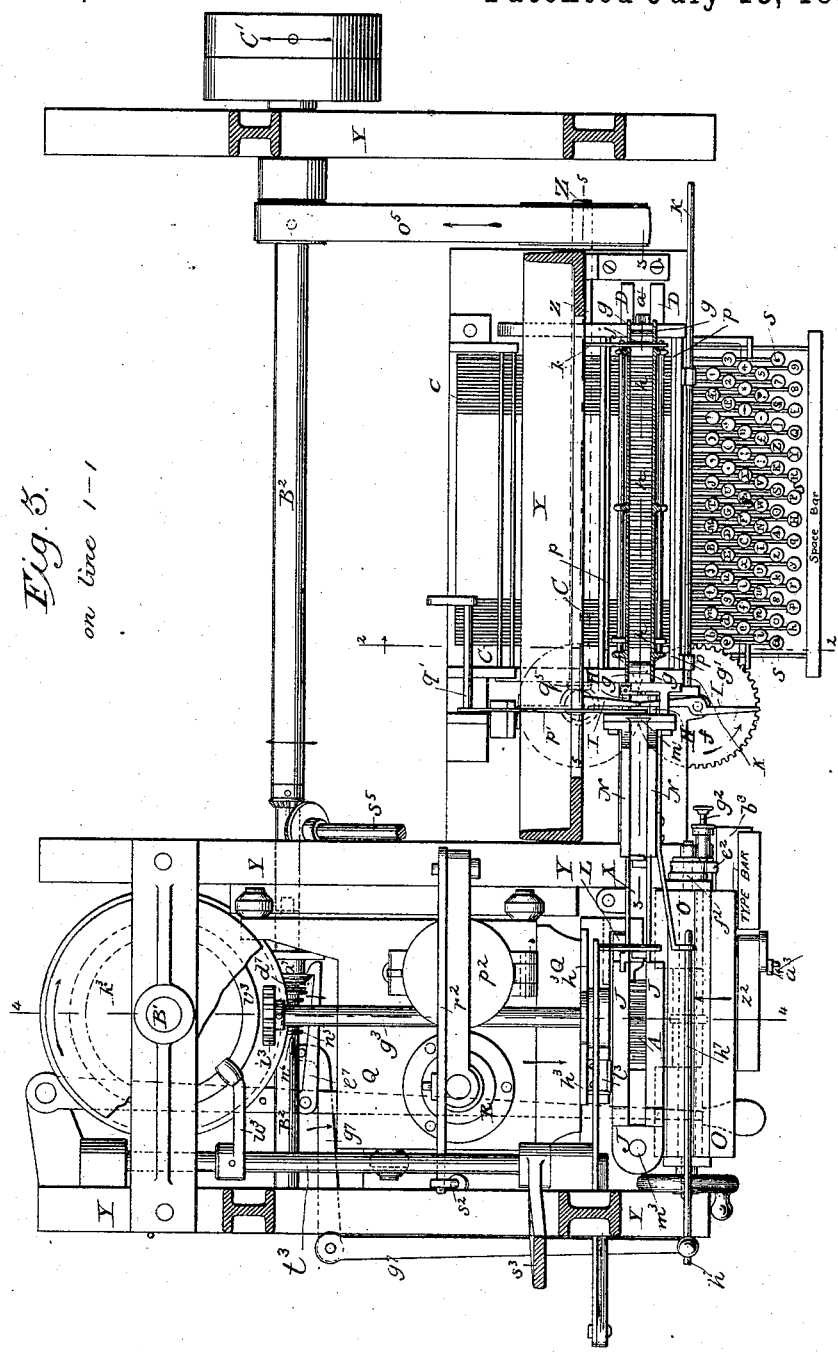
Figure 4:
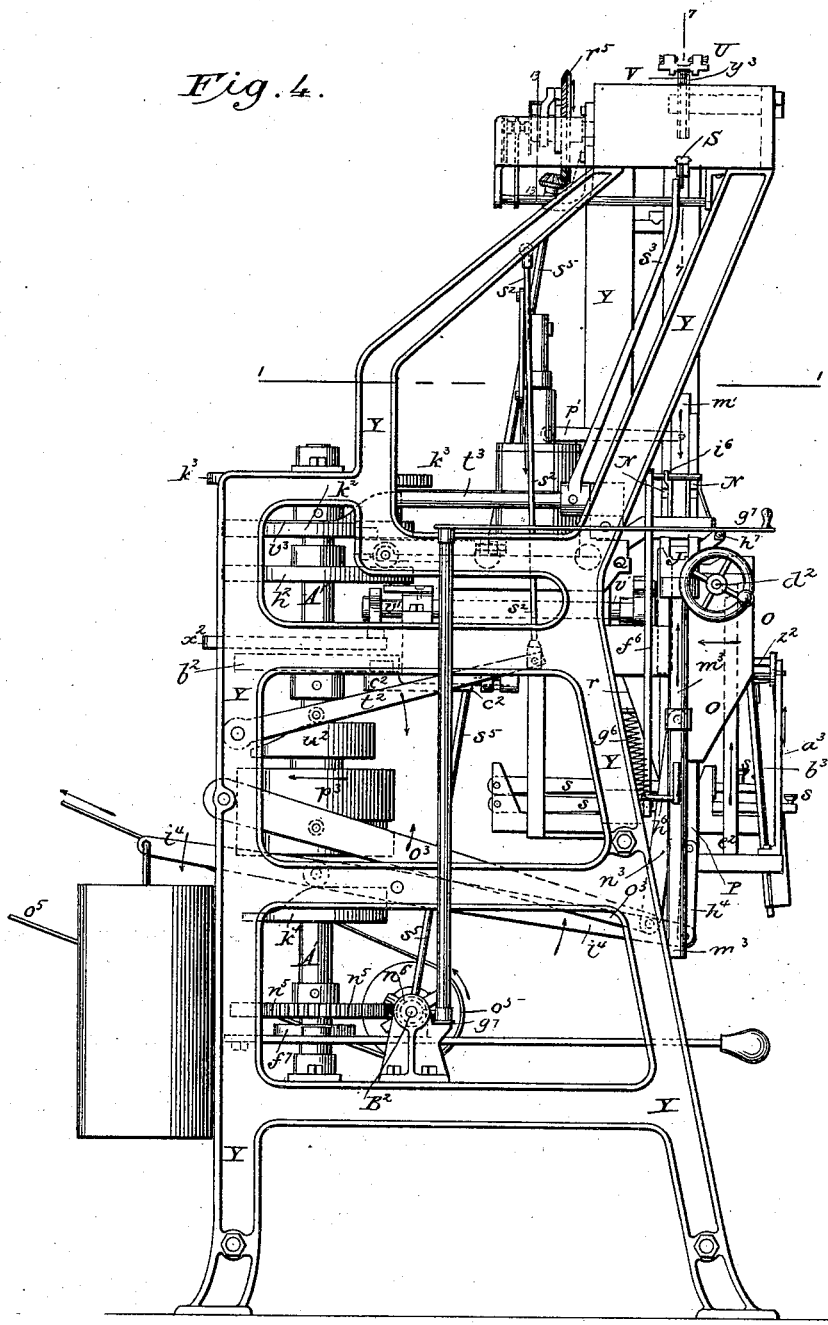
Figure 5:
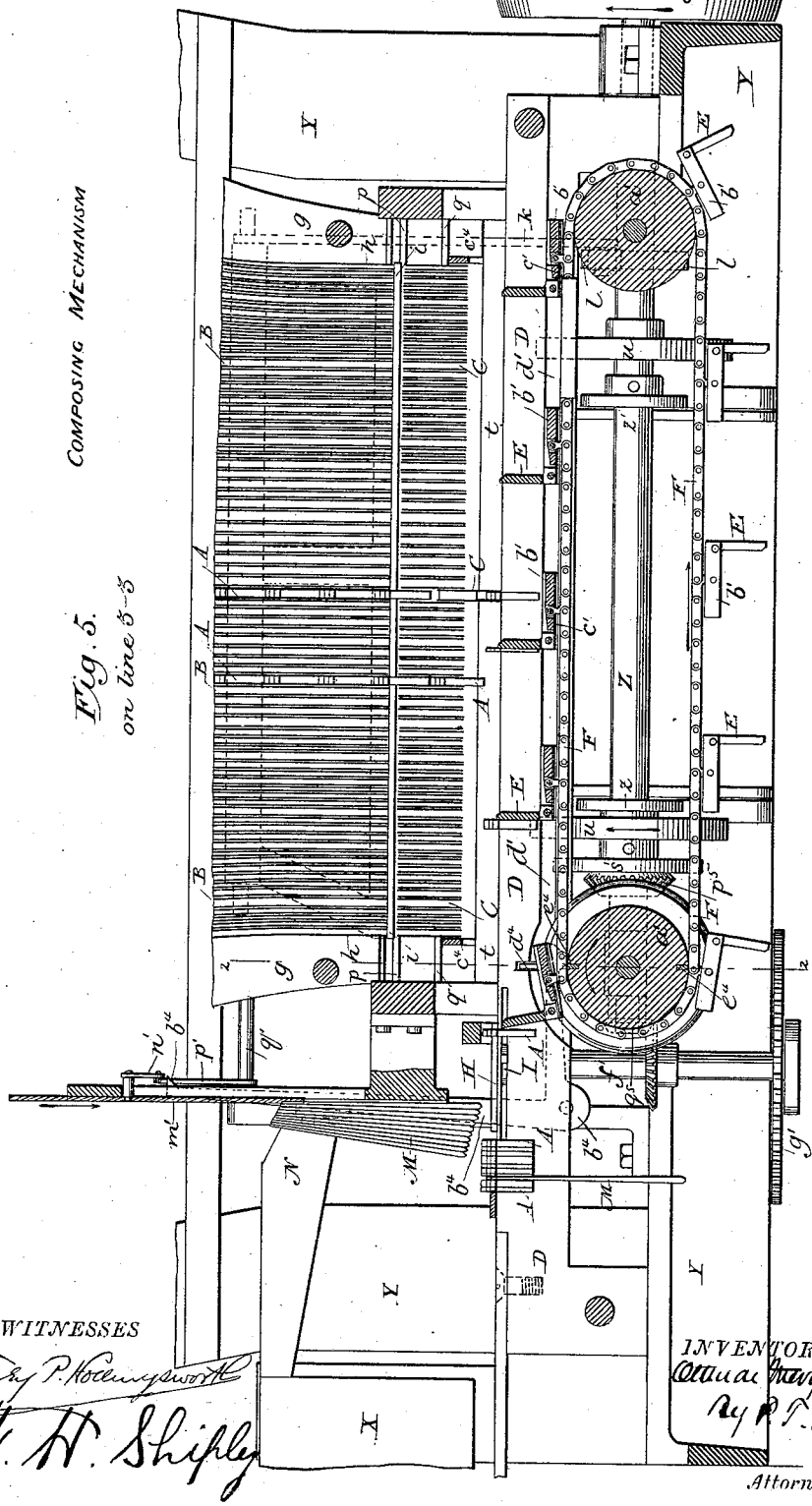
Figure 6:
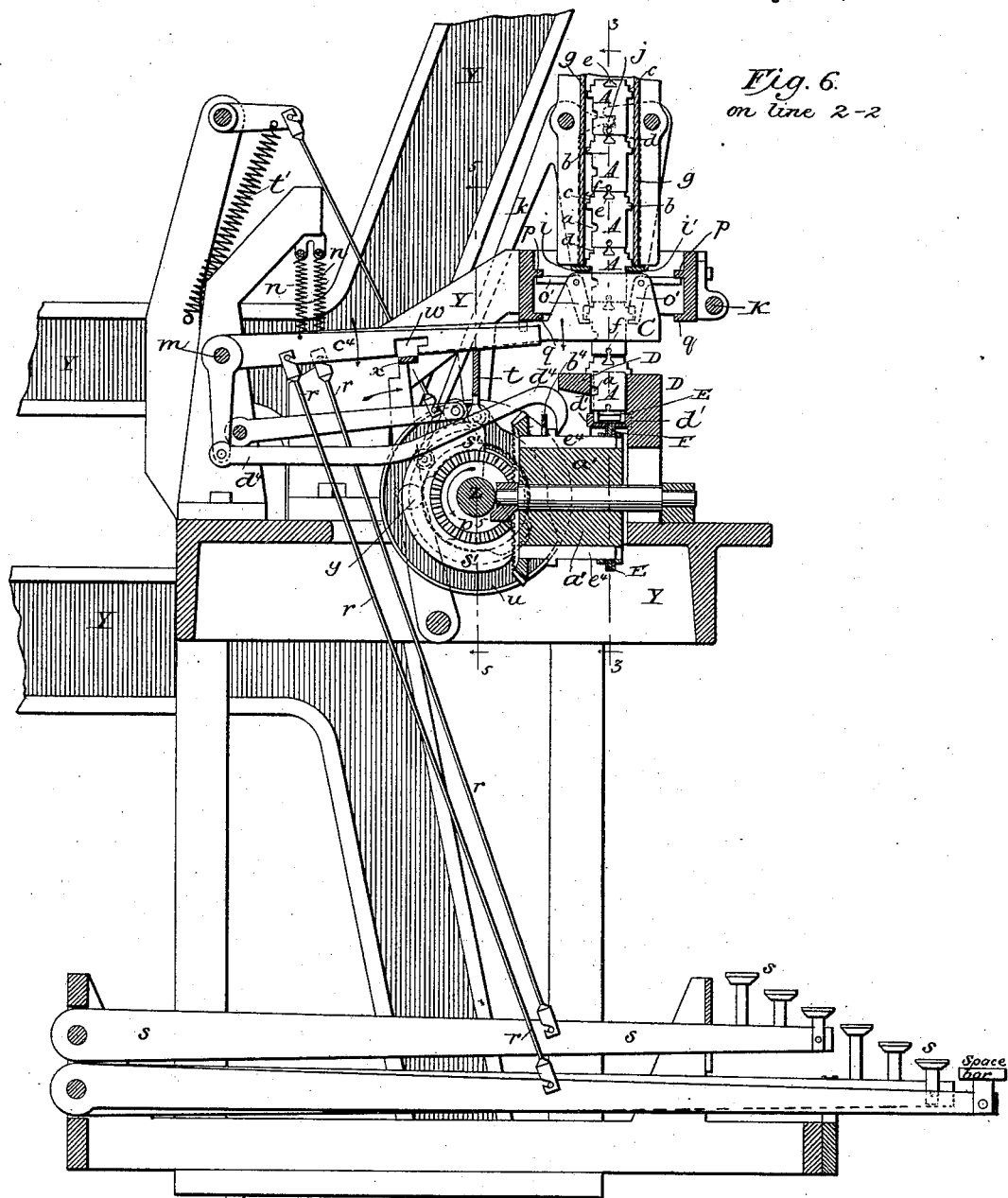

In the accompanying drawings, Figure 1 represents an outline elevation of my machine, in the nature of a diagram, designed to illustrate the general arrangement and operation of the principal devices. Fig. 2 is a front elevation of the complete machine. Fig. 3 is a top plan view of the same, the distributing mechanism and top of the main frame being removed to expose the parts thereunder. Fig. 4 is an end elevation of the same. Fig. 5 is a transverse vertical section through the magazine, the discharging devices, and the assembling or composing mechanism, on the line 3 3 of Fig. 3. Fig. 6 is a vertical section from front to rear on the line 2 2 of Figs. 2 and 3, showing particularly the mechanism for transferring the matrices from the magazines to the supporting-rails and assembling mechanism. Fig. 7 is a vertical section from front to rear, on the line 4 4 of Figs. 2 and 3, showing particularly the construction of the casting and clamping mechanisms, the parts being in the positions in which they stand during the assemblage of the matrices. Fig. 8 is a similar view through the front portion only, showing the position of the parts during the casting operation. Fig. 9 is a top plan view showing the rails upon which the matrices are delivered from the magazines, the mechanism for advancing the matrices therefrom, and the transferring-rails by which they are sustained during the casting operation and subsequently transferred to the distributing mechanism. Fig. 10 is a horizontal section on the line 10 10 of Figs. 7 and 8, showing particularly the mold and the clamps for confining the matrices. Fig. 11 is a vertical section on the line 5 5 of Fig. 3, showing the mechanism by which the keys are locked in position and prevented from operating, except in the proper way and at the proper time. Fig. 12 is a vertical cross-section of the distributing mechanism on the line 6 6 of Fig. 2. Fig. 13 is a longitudinal vertical section of the same on the line 7 7 of Figs. 4 and 12. Fig. 14 is a top plan view of a portion of the distributing mechanism and the attendant parts. Fig. 15 is a longitudinal vertical section through the center of the same on the line 7 7 of Figs. 4, 12, and 14. Fig. 16 is a plan view of the cams of the distributing mechanism. Fig. 17 is a horizontal section through the distributing mechanism, on the line 8 8 of Figs. 12 and 13, looking in a downward direction. Fig. 18 is a vertical section on the line 9 9 of the preceding figure. Fig. 19 is a perspective view showing a number of matrices. Fig. 20 is a perspective view of one of the space-bars. Fig. 21 is a face view of the rotary disk having the mold formed therein. Fig. 22 is an edge view of the same. Fig. 23 is a perspective view showing, in cross-section, the principal parts of the distributing mechanism and illustrating the manner in which the dogs mounted in the movable carrier-plates suspend the matrices by their upper end, and the stationary cams by which the dogs are opened to release the matrix. Fig. 24 is a horizontal section through the magazine, showing the details of its construction. Fig. 25 is a vertical longitudinal section through one of the yielding fingers for assembling or composing the matrices, showing the plate and spring by which it is supported. Fig. 26 is a face view of the slide by which the space-bars are placed in position for use. Fig. 27 is a detailed view of the adjustable devices for controlling the approximation of the clamps which confine the matrices laterally. Fig. 28 is a perspective view of the devices by which the matrices are transferred, one at a time, to the sustaining-dogs of the distributing mechanism. Fig. 29 is a cross-section of the distributer driving-clutch on the line 13 13 of Figs. 4, 12, and 14. Fig. 30 is a cross-section of the sustaining-rails, showing the manner of discharging the matrix-bars from the line of matrices. Figs. 31 and 32 are respectively a cross-section and a bottom face view of the distributer-plates in a modified form, with movable dogs to act on one edge, instead of on both edges of the matrices. Fig. 33 is a plan view, partly in section, of the driving-clutch connections for transmitting motion to the casting and clamping devices. Fig. 34 is a top plan view of the indicating and alarm mechanism. Fig. 35 is a vertical cross-section illustrating the parts shown in the preceding figure.

Referring to Fig. 1, which represents in outline only the leading features of my machine, A A are the matrices, placed one upon another, in the upright magazine-tubes B B, which converge from their upper to their lower ends, where they are assembled in close proximity and in a straight line; C, the movable escapement-keys by which the matrices are transferred, one at a time, from the respective tubes to stationary supporting-rails D, between which they hang suspended.

E E are yielding-arms attached to an endless belt, F, and carried thereby longitudinally between the rails D, for the purpose of carrying the matrices over the rails and assembling them in a compact form or line at one side.

H H are pawls or dogs between which the matrices are carried by revolving arms I, and by which their retrograde motion is prevented.

K is a horizontally-sliding rod to which the pawls H are attached, so that when the line of matrices is complete the movement of the rod to the left will cause the pawls to advance the entire series of matrices over the stationary rails into the vertically-movable rails J, by which they are supported in front of the mold L.

M M are a series of expansible space-bars, which hang suspended between stationary rails N, immediately over the point at which the matrices are assembled, so that by means of devices connected with the space-key they may be dropped, one at a time, into the line of matrices during the course of its assemblage or composition.

O O are mechanically-operating clamps, which are advanced automatically on opposite sides of the line of matrices after they are in position in front of the mold.

P is a vertically-acting pressure device, by which the space-bars are lifted simultaneously and caused to expand the line of matrices between the clamps immediately previous to the casting operation.

Q is a melting pot provided with an automatic pump, R, by which molten metal is delivered into the mold to receive the impression of the matrices, which, for the time being, close the side of the mold.

After the casting operation the clamps are retracted and the matrices released, after which the lifting or transferring rails J rise to the position indicated by dotted lines, carrying with them the entire line of matrices and space-bars. A slide, S, moves the matrices horizontally out of the lifting-rails to stationary rails T, from which they are lifted, one at a time, to clamping jaws or dogs in plates U, attached to a horizontal traveling chain, V. The dogs are controlled in their action by cams or inclines on stationary rails W in such manner that the dogs carrying each matrix are separated at the proper time to drop the matrix into the appropriate magazine. The space-bars escape through suitable openings in the rails and fall into a vertically-moving receiver, X, from which they are transferred at the proper time to the rails N, preparatory to further use.

It will be perceived that the plan of operation embraces, as a leading feature, a circulatory movement of the matrices—that is to say, their delivery from the magazine, their assemblage and presentation to the casting mechanism, and their distribution and return to the magazine.

Having thus outlined the construction and mode of operation, I will now proceed to describe the details.

*Matrices.*—I provide for use in the machine a suitable number of separate or independent matrices, A, each consisting, as shown in Fig. 19, of a small plate of metal or other suitable material, bearing in one of its vertical edges a single letter or character, as seen at *a*, or two or more characters, which are always to appear together—such, for example, as the ordinary prefixes and affixes, and words of very frequent use containing but a small number of letters. The matrices may be made of any appropriate size; but I recommend a width of three-fourths of an inch and a length of one and one-fourth inch, or thereabouts, practical experience having shown this size to be the most convenient. Each matrix is formed with supporting-shoulders *b*, projecting from opposite edges near the top. Above the shoulders *b* the matrix is reduced in width, and presents on each edge two shoulders, *c* and *d*, the width of the neck between the lower shoulders, *c*, being greater than that between the upper shoulders, *d*, as plainly represented. These shoulders are designed to co-operate with the distributing devices, and are the means by which said devices are enabled to distinguish between the matrices carrying the different characters. All matrices bearing the same letter are exact duplicates; but matrices bearing different letters differ in the width between their shoulders. In its upper end each matrix is provided with a dovetailed or shouldered notch, *e*, to co-operate with a tapered or shouldered rail forming part of the distributing mechanism, these notches differing in size in the matrices of different characters. In the lower end each matrix is provided with a keyhole slot or opening, *f*, to co-operate with the device, by which the matrices are prevented from lifting accidentally during the course of distribution. The respective matrices differ in thickness according to the width of the characters therein, each having a width but slightly in excess of its character, so that the characters may be brought closely together when the matrices are assembled in line side by side.

*Spacing-bars.*—In order to provide for spaces between the terminal characters of words, and to permit of the spaces in a line being simultaneously increased to effect the justification of the line, or, in other words, to expand the line to the predetermined length, I provide space-bars M, such as represented in Fig. 20, consisting of a longitudinally-tapered or wedge-like bar, *k'*, united by a dovetail sliding connection to a head or plate, *l'*, provided with suspending-shoulders identical or substantially identical with those on the matrices, so that the space-bars may be introduced in the line between the matrices and suspended and distributed in like manner. The outer faces of the parts *k'* and *l'* are parallel with each other. By moving the part *k'* upward with respect to the head the device is caused to present an increased thickness at its operative point, thus forming an expansible spacing device. This device, separately considered, constitutes no part of the present invention, being substantially identical with that described and claimed in my application for Letters Patent filed on the 18th day of April, 1885, No. 162,714.

*Main frame.*—The main frame Y may be of the form and construction represented in the drawings, or of any other appropriate construction adapted to receive and support the various operative parts hereinafter described. It is to be borne in mind that all parts of the frame Y are stationary.

*Magazine.*—The magazine B consists, as shown in Figs. 2, 3, 5, 15, and 24, of two parallel vertical plates, *g*, and intermediate sheet-metal partitions, *h*, the edges of which are seated in grooves formed in the plates, thus dividing the space between the plates into a series of matrix tubes or channels corresponding in width to the thickness of the matrices which they are to receive. The partitions are to be made of exceedingly thin metal, in order that the tubes may be brought together at the base in the smallest space possible. Toward their upper ends the channels diverge in order to produce mouths of increased width, so as to admit of the matrices dropping therein with certainty, and prevent a matrix designed for one tube from being carried accidentally into the mouth of the next. Each tube is separated from the next by two partition-plates joined at the top and bottom, but separated between said points, as shown.

*Sustaining-dogs.*—For the purpose of sustaining the columns of matrices in the magazine I provide two dogs, *i* and *i'*, extending lengthwise beneath the edges of the entire series of magazines, as represented in Figs. 5 and 6, so as to engage beneath the shoulders of the lowermost matrices in all the magazines and prevent them from descending. The dogs are attached to pivoted arms jointed together, as seen at *j*, Fig. 6, whereby they are caused to open and close in unison, and thus engage and release the matrices simultaneously at the two edges. One of the dogs is provided with depending arms *k*, the lower ends of which are acted upon by cam-wheels *l*, so that the dogs are engaged and disengaged automatically at regular and frequent intervals. Under the mouth of each magazine-tube there is a vertically-movable escapement-key, C, having in its end a vertical opening, through which the matrices may pass from the magazine above to the supporting-rails beneath. The series of escapement-keys lie parallel with each other, and are mounted at their rear ends on a common pivot, *m*, so that their forward ends may rise and fall. Attached to each key there is a spring, *n*, by which the forward end of the key is held normally in an elevated position close to the mouth of the magazine. In each key, on opposite sides of the opening for the matrix, there are two angular dogs or detents, o', notched at their lower ends, to engage the shoulders of the matrices as the latter are dropped into the key from the magazine. The upper ends of the dogs o' are extended outward in position to engage shoulders p and q, formed on the main frame. When the key rises, the shoulders p engage the dogs and cause their inner ends to close together, so as to confine the matrix firmly between them; but as the key descends the dogs, carrying the matrix positively downward, finally encounter the shoulders q, which have the effect of separating the dogs and disengaging them from the matrix, allowing it to fall between and upon the supporting-rails D. The escapement-key and its dogs are necessary, in order to insure the downward movement of the matrix when the keys are rapidly operated, it being found in practice that an operator will manipulate the finger-keys so rapidly that the matrices will not descend by gravity alone, the interval between the operation of one key and another being so brief that the detent mechanism will relock the matrices before gravity has time to start them. After the escapement-key has discharged one matrix and risen to its normal position it will receive another matrix as soon as the automatic dogs i i' are disengaged, so as to permit the column of matrices to descend. If, however, an escapement-key contains a matrix at the time that the automatic dogs are opened, it follows that the matrix in the key will prevent the column above from descending, and consequently the action of the automatic dogs is without result. It is this fact which permits the two automatic dogs to be used for the entire series of magazines. The escapement-keys are each connected by a rod, r, to a finger-key, s, each character and magazine being represented by its own finger-key, the depression of which has the effect of discharging the corresponding matrix instantly upon the rails.

*Locking mechanism.*—In order to insure the rising action of the escapement-keys after the discharge of the matrices, I extend lengthwise beneath them a blade, t, working at its ends in vertical slides and actuated, as shown in Figs. 6 and 11, by grooved cam-wheels u, applied to the main horizontal shaft Z, so that at each revolution of the shaft the blade and escapement-keys are forcibly lifted. In order to enable the operator to control the keys with increased facility, and to determine the order in which the characters shall be delivered, as hereinafter more fully explained, I provide the entire series of escapement-keys with shouldered or undercut notches, w, as shown in Fig. 6, and extend beneath the keys a horizontal bar, x, attached to pivoted arms and provided with a stud or roller, y, engaging grooved cam-wheels z on the main shaft, whereby the bar is given a forward and backward movement at each rotation. The pressure on the finger-key urges the escapement-key downward; but the bar x prevents the key from descending, except during the rotation of the cam-wheel, at which time the bar stands beneath the open portion of the slot w. Whenever a key is depressed, it is prevented from rising again until the proper time by the bar x, engaging in the shoulder or offset portion of the notch. Thus it will be seen the locking-bar x serves to control the time when a key may be depressed, as well as the time when it may be elevated.

*Matrix-assembling and composing mechanism.*—The stationary rails D, on which the matrices are delivered, are continued to the left a considerable distance beyond the magazines. The endless chain F travels at its upper side between or immediately beneath these rails, around supporting-rolls a' at its ends, and carries on its outer edge a series of plates, b', to the ends of which the matrix-carrying fingers E are pivoted. Springs c', seated in the blocks, as shown in Fig. 25, tend to hold the fingers in a position perpendicular to the plates, so that as the chain is moved in the direction indicated by the arrow, the fingers will be carried in an upright position between the rails D, so as to act upon the matrices as they are dropped, one after another, between the rails, and carry them successively toward the left. The pivoting of the fingers is not a necessary feature, but is adopted in order that they may yield and fold downward in the event of an obstruction being encountered. In order to insure a proper guidance of the fingers during their action on the matrices, I provide the lower edges of the rails D with grooves d', to receive and guide the edges of the plates b', as plainly shown in Figs. 5 and 6. For the purpose of advancing the matrices still further along the rails after the carrying-fingers E cease their action thereon, I employ two revolving arms, I, attached to vertical shafts f', located on opposite sides of the rails, as seen in Figs. 1, 2, and 5, and connected at their lower ends by gears g', which cause them to revolve in unison, so that their ends act at the same instant against the side of the matrix to sweep the same forward along the rails. In order to prevent retrograde motion of the matrices, I provide two horizontally-swinging pawls or dogs, H, pivoted at opposite sides of the rails, and acted upon by closing springs, so that while they yield and permit the matrix to be advanced between and beyond them by the arms I, they will immediately close behind the matrix, as shown in Fig. 9. These pawls are pivoted, as shown in Figs. 2 and 9, to an arm on the horizontal sliding rod K, which is mounted in guides on the main frame and provided with a knob or hand-piece, by which the operator may move it at will toward the left, thereby moving the pawls and causing them to advance the assembled matrices over the ends of the stationary rails to the vertically-movable rails J, which are, for the time being, in line with the stationary rails.

*Insertion of space-bars.*—In order that the space-bars M may be introduced at the proper points in a line of matrices during the course of their assemblage, they are suspended in series side by side above the rails D, on stationary rails N, just forward of the rotary arms I, as shown in Figs. 1, 2, and 5, so that whenever a space-bar is released it may descend into position between the matrix last added to the line and the one next succeeding. The rails N incline forward toward their delivery end, so that the bars M descend by gravity against the face of a vertical slide, $m'$, the lower end of which is notched, as shown in Fig. 26, to correspond in shape with the upper end of the space-bar, so that when the slide is lifted the head of the foremost bar will pass therein and be carried positively downward to its place by the descent of the slide, which in the meantime closes the passage, so as to prevent the next bar from escaping. After being carried downward the space-bar is forced laterally out of the slide against the matrices by the revolving arms I or the matrix following next behind it. The slide $m'$ may be actuated in any suitable manner; but I commonly connect it by a link, $n'$, to an arm, $p'$, on a horizontal rock-shaft, $q'$, having a second arm connected, as in Fig. 5, to a lifting-cam, $s$, on the main shaft Z. A spring, $t'$, applied to act upon the arm of the rock-shaft $q$, as in Figs. 6 and 11, or in any other suitable manner, serves to depress the slide when it is relieved from the influence of the lifting-cam. Owing to the fact that certain of the matrices require to be carried a considerable distance to the place of assemblage, while the space-bars drop directly into position, it may sometimes chance that the space-key will be operated before a matrix previously designated has passed the space-bar. To prevent the space bar in such case from being dropped in front of the matrix, I provide a safety mechanism, such as shown in Figs. 5 and 6. A lever, $b^4$, pivoted to the frame, acts at its upper end to prevent the descent of the slide $m'$. The lower end of this lever stands adjacent to the roll $a'$, which carries one end of the chain F. In the circumference of this roll there are mounted two slides, $e^4$, moving in an axial direction, and each having at the inner end a stud or projection, as shown in Fig. 6. A finger-key for spacing purposes, commonly denominated the "space-key," is connected by a rod, $r$, to an angular lever, $c^4$, to which there is jointed a hooked arm, $d^4$, designed to engage with the projection on the slides $e^4$, and move them endwise, so as to bring their projections into position to act on the lever $b^4$, and thereby release the devices for discharging the space-bar. The lever $c^4$ is controlled by the locking-bar $x$, as shown in Fig. 6, in the same manner that the escapement-keys C are controlled, so that the space-releasing key can only be operated at the instant when the slides $e^4$ are opposite the hook $d^4$, so as to be moved thereby. It will be understood that a space-bar can only be lowered during the time that the projected slide $e^4$ is acting on the lever $b^4$. Now, as the roll carrying the slide must make nearly an entire revolution after the depression of the space-key before the slide can act on the releasing-lever $b^4$, it follows that the carrying-chain will be allowed to move in the meanwhile a sufficient distance to carry the matrix previously designated and delivered upon the rails to its place before the space-bar can drop into position.

*Casting and clamping mechanism.*—The shifting-rails J, to which the assembled matrices are transferred from the stationary rails, as before explained, and which are grooved to engage the shoulders of the matrices to prevent them from rising or tipping, stand in such position as to suspend the matrices directly in front of the mold and between it and the clamping mechanism O. The mold L consists, as shown in Figs. 21 and 22, of a vertical rotary disk or wheel containing a slot, $u$, which extends therethrough from one face to the other, and which is of the exact dimensions of the required type-bar. The opening is usually given a slight enlargement from the rear to the front, to facilitate the delivery of the bar, the taper of which will be corrected by subsequent treatment. The disk may be made in one piece with the slot therein, or it may, for the sake of convenience, be built up of separate pieces, as represented in the figures just referred to. When built in sections, the part containing the slot or mold proper may be dovetailed or otherwise secured to the remaining portion, so as to be readily removed to permit the application of a mold of different size, as occasion may demand. The mold-wheel is secured, as shown most plainly in Figs. 3, 7, and 8, on the end of a horizontal shaft, $v'$, mounted in bearings on a plate, $w'$, which is free to slide to and fro in guides on the main frame, so that the mold-wheel may be forced tightly against the matrices during the casting operation, and subsequently retracted in order to withdraw the type on the bar from the cavities of the matrices, that the latter may be removed without the mutilation of the type. The mold is arranged to revolve, in order that it may carry the completed bar to a position from which it may be discharged without interference from the matrices or clamping devices, as hereinafter explained. It is necessary that the line of matrices shall be clamped tightly together laterally, in order to prevent the metal from flowing between them, and also that they shall be forced edgewise tightly against the face of the mold which coincides with their characters. For this purpose I provide the clamping mechanism O, which is movable bodily in a horizontal direction in guides on the main frame, so that it may act against the outer edges of the matrices and force them against the mold. This clamp is provided, as shown in Figs. 3, 7, and 10, with jaws $a^2$, which slide horizontally to and from each other in the direction of the length of the line of matrices. During the time that the matrices are being moved into position the clamp is moved backward out of their path, as shown in Fig. 7, so that the matrices may move past the jaw $a^2$ without interruption. After the matrices are in position in front of the mold the clamp moves forward toward their rear edges, carrying with it the jaws, which are thus brought into position opposite the ends of the line, so that upon being advanced toward each other they will force the matrices tightly together. By this joint action of the jaws against the sides of the matrices and of the main clamp against their rear edges they are held firmly against each other and against the face of the mold. The advance of the clamp is effected, as shown in Fig. 7, by means of a grooved cam-wheel, $b^2$, engaging a stud or roller on an arm, $c^2$, which is adjustably attached to the guide-arm of the clamp. In order that the rails J may be brought with precision to the position required for the presentation of the matrices to the mold, I provide the main clamp O with one or more studs or lips, $a^9$, as shown in Figs. 7 and 8, to enter corresponding recesses in one of the rails J when the clamp is moved forward. The approximation and separation of the jaws $a^2$ is secured by means of a right and left hand screw, $d^2$, mounted in the clamp and fixed against end motion. The screw is automatically turned, as shown in Figs. 2, 7, and 27, by a vertically reciprocating bar, $e^2$, actuated as hereinafter described, and arranged to engage a crank rigidly but adjustably secured to a wheel, $f^2$, secured to the end of the screw. In order that the parts may be adjusted to close the jaws a greater or less distance, according to the length of the type-bar to be produced and the corresponding length of the line of matrices, I provide the wheel $f^2$ with a series of holes, and connect the crank thereto by means of a pin, $g^2$, which may be inserted in either one of the holes, so as to hold the crank in different positions. This construction permits the jaws to be automatically stopped at any desired distance apart, so as to determine positively the elongation of the line of matrices by the spacing devices, and thus insure the production of type-bars of uniform length, at the same time enabling the operator to adjust the machine for longer or shorter bars, as may be desired. In order to operate the space-bars, and expand the line of matrices between the jaws after the latter are in position, I provide a vertically-sliding plate, P, dovetailed or otherwise attached to the front of the main clamp O, so as to be carried beneath the space-bars as the clamp is advanced. When this plate rises, it drives upward all of the space-bars simultaneously. The plate P is connected by a link, $h^4$, with a lever, $i^4$, provided at the rear end with a weight, which acts to drive the plate forcibly upward when the parts are released. The weight is lifted and the plate depressed, and maintained in its depressed position during the proper intervals, by a horizontal cam-wheel, $k^4$, acting, as shown in Fig. 7 and elsewhere, against a roller on the lever. The plate P is connected by an arm with the bar $e^2$, which adjusts the jaws $a^2$, and with the bar $a^3$, which tilts the receiving-fingers $z^2$. The mold is moved to and from the matrices at the proper times by means of a horizontally-grooved cam-wheel, $h^2$, engaging a stud or roller on an arm projecting from the plate which carries the shaft of the mold, as in Fig. 7. The cam-wheel is so timed with reference to the cam $b^2$, which advances the clamp, that the matrices are held firmly between the clamp and the mold during the casting action. Behind the mold-wheel is located a flat melting-pot, Q, mounted horizontally on suitable guides, and moved to and fro by means of a horizontally-grooved cam-wheel, $k^2$, which engages a stud or roller on an arm, $l^2$, adjustably secured to the pot. The cam-groove is of such form that the mouth of the pot is advanced against and held in intimate contact with the rear face of the mold during the casting of the bar. The pot is in the form of a flat box covered at the top, and has at its front a narrow delivery slit or mouth, $m^2$, through which the molten metal is ejected into the back of the mold directly toward the matrices on the opposite side. The lower part of the pot, to which the heat is applied, is insulated from the upper portion by an intervening layer of asbestus or equivalent non-conducting material, $n^2$, which serves to lessen the transmission of heat by conduction to the parts above. Beneath the melting-pot there is a box or chamber, $o^2$, which will contain a gas-burner or other appropriate means for heating the pot and maintaining the metal constantly in a molten condition. The pot is provided on one side with an opening having a hinged lid, $p^2$, through which to introduce the metal, and is provided on the opposite side with a force-pump, R, by means of which the metal is forcibly driven from the pot to the mold. This pump, which in itself forms no part of the present invention, may be identical with that described in Letters Patent of the United States granted to me on the 3d day of March, 1885, No. 313,244, or be otherwise constructed as may be preferred. The pump-plunger, which is depressed by a spring, is lifted by a lever, $r^2$, pivoted at one end to a fixed bearing, connected by a link to the plunger, and connected at its free end to a rod, $s^2$, which latter is attached at the lower end to a lever, $t^2$, carrying a stud or roller acted upon by a lifting-cam, $u^2$, as plainly seen in Fig. 4. The rotation of the mold is secured by means of a mutilated pinion, $w^2$, on a horizontal cam-wheel, $x^2$, as plainly shown in Fig. 7. Below the shaft of the mold there is a horizontal ejector-slide, $y^2$, one end of which bears a stud or roller seated in a cam-groove on the under side of the wheel $x^2$. The parts are so timed that after the casting operation is finished the mold-wheel is given a half-revolution, so as to bring the mold directly opposite the end of the slide $y^2$, which is then driven forward, the mold being at rest, so as to drive the completed bar from the mold on the forward side, and through an opening in the clamp O to a finger, $z^2$, pivoted on the front of the clamp, after which the ejector is retracted and the mold rotated to its original position, preparatory to the next casting operation. The end of the ejector is united to the remaining portion by a screw, as shown in Fig. 7, so that it may be disconnected and replaced by another in the event of breakage or other accident. The finger $z^2$ is supported by a horizontal pivot, and receives at suitable intervals a half-revolution through the action of a vertically-reciprocating arm, $a^3$, actuated as elsewhere described, which engages a stud or studs on the front of the finger. By this rotary motion the finger is caused to deliver the bars, one upon another, to a galley or receiving-frame, $b^3$, containing a vertically-sliding follower, $c^3$, maintained by friction, by a weighted cord or otherwise, so that it will gradually sink as the bars are accumulated, that the bars may be assembled in the form of a column ready for immediate use. By the rotation of the mold the bars which are cast right side up are reversed; but this reversal is corrected by the rotary motion of the finger, so that the bars are assembled in the proper position for use. The galley $b^3$ is attached to the main clamp O by a horizontal pivot or journal, $e^3$, which permits the galley to be turned up to a horizontal position at will, in order that the operator may inspect the bars therein. The journal will be secured in position by means of a removable pin, $f^3$, or other equivalent fastening device, which will admit of the galley being quickly removed when full. Practical operations have shown that it is desirable to wipe the faces of the mold and the melting-pot from time to time, in order to prevent the accumulation thereon of the metallic oxide or other matters, which would prevent them from fitting closely together. To this end I mount in bearings on top of the melting-pot a horizontal shaft, $g^3$, provided at one end with wiping-arms $h^3$, and at the opposite end with a pinion, $i^3$, so that it receives an intermitting motion from teeth formed on a horizontal wheel, $k^3$, as shown in Figs. 2 and 3. It is desirable that the bases of the bars shall be rendered perfectly true, for which purpose I secure to the main frame or other suitable support, immediately in rear of the mold, a stationary knife, $l^3$, as plainly shown in Fig. 2, in such position that as the mold is turned from the position it occupies in casting to the position for delivering the bar it carries the base of the bar across the edge of the knife.

*Distributing mechanism.*—After the casting is completed and the matrices released it is necessary that they shall be lifted to the distributing mechanism above, for which purpose the shifting-rails J are secured to a vertically-sliding rod, $m^3$, working in suitable guides on the main frame and connected by a link, $n^3$, as shown in Figs. 2 and 4, to a lever, $o^3$, actuated by a horizontal cam-wheel, $p^3$. The shifting-rails rise to the level of the elevated stationary rails T, and remain momentarily at rest, during which time a horizontal slide, S, acts to push the matrices from the shifting to the stationary rails. This slide is urged constantly forward by a spring, $q^3$, and is connected by an operating-link, as in Fig. 2, to a lever, $s^3$, on a horizontal rock-shaft, $t^3$, mounted in fixed bearings, and provided at its rear end with an arm, $u^3$, actuated by a horizontal cam-wheel, $v^3$, which latter serves to retract the slide at suitable intervals, so that another group of matrices may be introduced in front thereof. As the matrices are urged along the stationary rails T by the slide, they are arrested by the forward matrix coming in contact with a forked arm or finger, $w^3$, such as represented in Figs. 15 and 28. In front of this arm there is a vertically-reciprocating finger, $x^3$, which engages beneath the matrices and lifts them, one at a time, as they advance in succession until their supporting-shoulders ride over and rest on top of the arm $w^3$, whereby the matrices are sustained, one at a time, in such position as to be engaged by the dogs or jaws of the distributing mechanism, which I am about to explain. The horizontal endless chain V, traveling around supporting-wheels $y^3$, carries a series of plates, U, arranged end to end, and guided during their movement along the under side of the chain by means of ways or tracks formed on a stationary plate, T, this plate being grooved longitudinally through the center, in order that the matrices may be carried therethrough. Each of the plates carries a series of horizontal sliding dogs or jaws, $a^4$ and $a^5$, designed to engage the shoulders $c$ and $d$ at the top of the matrices, in order to suspend the matrices between them until they are carried forward over the mouths of their proper magazine-tubes, into which they are permitted to fall by the opening of their jaws. Each of the jaws $a^4$, sliding inward from one side of the plate, is opposed by a corresponding jaw sliding inward from the opposite side, and, in like manner, each of the jaws $a^5$ is opposed by its counterpart. It will be observed that the jaws $a^4$ are arranged directly over the jaws $a^5$, so that whenever a matrix is introduced between them its lower shoulders, $c$, will be grasped by the jaws $a^5$, and its upper shoulders, $d$, grasped by the jaws $a^4$. Thus it will be seen that each matrix is suspended by two pairs of jaws acting at the same time, and in order to release the matrix, that it may descend into the magazine, it is necessary that both pairs of jaws be disengaged at the same time, the disengagement of either pair alone leaving the matrix suspended by the others. It is this employment of two or more pairs of jaws to act upon each matrix that enables the machine to distinguish with certainty between matrices representing different letters, and which have a comparatively slight difference in size. The jaws are urged inward and held in contact with the matrices by means of spiral springs $b^5$, applied as shown in Figs. 17 and 18, to act on pins projecting from the jaws. The opening of the jaws to effect the release of the matrices at the proper points is secured by means of stationary cam-plates $c^5$ and $d^5$, having upturned edges which engage in notches formed in the ends of the respective dogs, as plainly represented in Figs. 12, 17, and 23. These flanged edges are so shaped and stand at such distance apart that the two clamps by which any matrix may be sustained are disengaged simultaneously when the matrix is over the particular magazine-tube in which it belongs. Owing to the great number and variety of matrices required in the machine the cams are necessarily arranged in such manner that one pair of jaws carrying a matrix may be repeatedly opened before the matrix reaches the proper point for its release; but, for reasons before explained, this action does not interfere with the proper distribution, the matrix being released only when both jaws are opened simultaneously. The cam-plates may be shaped and arranged as represented in the drawings, or in any other manner which will permit the dogs to traverse them, provided only they are so arranged with reference to each other and to the respective tubes of the magazine that the dogs for a matrix of any given width shall be separated simultaneously at the mouth of the proper tube, and at no other place. As an additional means of securing the proper distribution of the matrices, I propose to suspend centrally over the path of the matrices a bar or rail, $e^5$, of a dovetailed or flanged form, to enter the notches $e$ in the upper ends of the matrices. This rail is made of diminishing width from the forward toward the rear end, and the matrices representing the various characters have notches correspondingly graduated in size, so that the matrices which are to be deposited in tubes near the rear end of the rail will, by reason of their small openings, hang suspended thereon until they have reached the proper point. The rail may be divided, as shown, into three or more sections of different widths; or it may be gradually tapered from end to end. This rail is not in all cases a necessary part of the machine; but its use is recommended, for the reason that it is an additional safeguard against the release of a matrix at an improper point. When the rail is used, the concurrence of three things is necessary to the release of a matrix—namely, the notch $e$, of sufficient size to permit the matrix to drop from the rail, and the opening of both pairs of clamping-jaws at one time.

While I have represented the jaws of the distributing mechanism arranged in pairs or sets opposing each other, so that each matrix will be sustained between movable jaws or clamps at the two edges, it is to be distinctly understood that good results may be secured when the movable clamps at one side or edge are omitted and fixed clamps or bearings used in their places. I have represented this modification in Figs. 31 and 32 of the drawings, in which $a^4$ and $a^5$ represent the movable jaws constructed and actuated by springs, in essentially the same manner as in the preceding figures, to act on one edge of the matrices, and $a^6$ the fixed bearings or jaws against which the matrices bear at the opposite edge, being forced against the same by the pressure of the movable jaws.

The manner in which the matrices are introduced between the clamping-jaws of the distributer will now be more fully described. Each of the distributer-plates V has on its back a line of gear-teeth, $f^5$, which engage a driving-pinion, $g^5$, on the shaft of a wheel, $h^5$, the inner face of which is provided with a serpentine groove, $i^5$, which receives a stud on the side of the arm which carries the lifting-finger $x^3$, before alluded to. The advance of the distributer-plates is consequently accompanied by a rotary motion of the cam-wheel, which in turn causes the rising and falling motion of the finger $x^3$. The parts are so timed and arranged that the finger is thrust upward during the passage of each pair of clamping-jaws thereover. The frame is provided, as shown in Fig. 16, with stationary oblique ribs $k^5$, which act to separate the clamping-jaws to their greatest extent immediately before they reach the lifting-finger $x^3$, so that when the finger lifts a matrix from the rails T into position between the jaws the latter will be open to receive it. The matrix thus presented between the open jaws is carried forward by the movement of the parts and sustained momentarily by the fingers $w^3$ on top of which the shoulders of the matrix will bear for the moment. As the parts move backward, and before the matrix is carried clear of the finger $w^3$, the jaws pass clear of the opening-ribs $k^5$, and are permitted to close upon the matrix, which is carried forward in its pendent position until discharged, as before described. As the matrices are lifted, one after another, by the finger $x^3$ there is danger of their adhering to each other and rising in couples. To avoid this difficulty, I locate beneath the rails a small plate or finger, $m^5$, the upper edge of which is enlarged and arranged to enter the key-hole slots in the lower ends of the matrices, which are therefore prevented from rising. As the matrices move forward, they pass clear of this plate, the foremost matrix on which the lifting-finger acts being always free to rise, while the one next in its rear is prevented from rising. The delivery of the space-bars from the line of matrices is effected as plainly represented in Fig. 30, the head of the space-bars being made of a width slightly less than that of the matrix-bars, so that the space-bars may drop between the sustaining-rails T, while the matrices upheld by the rails continue their movement to the distributing devices. A vertically-movable slotted receptacle, X, is arranged in position to receive the space-bars as they drop from the line and lower them to the level of the sustaining-rails N. The bars are suspended by their heads in this receptacle, and are transferred therefrom to the rails N by a horizontal reciprocating arm, $e^6$, attached to the upper end of a lever, $f^6$, as shown in Fig. 2. The lever $f^6$ is urged inward by a spring, $g^6$, attached to its lower end, but is thrown outward at the proper time by a pin, $h^6$, attached to the vertically-moving guide $m^3$, before referred to. As the guide $m^3$ raises the pin from the horizontal end of the lever, the spring acts to move the lever to the right, forcing the space-bars from the movable support X to the stationary rails N. The rising movement of the carrier X is effected by means of the matrix-shifting rails J, which engage a lip or projection, $i^6$, (shown in Fig. 2,) on the carrier.

*Details of driving mechanism.*—The several cams, $b^2$, $x^2$, $k^1$, $k^3$, $k^4$, $p^2$, and $u^2$, are all mounted on the vertical shaft A′, sustained in bearings in the main frame. This shaft receives motion through a worm-wheel, $n^5$, thereon, from a worm, $n^6$, on the main driving-shaft, $B^2$, seated horizontally in bearings in the base of the frame and provided at its outer end with a driving-pulley, C′. Motion is communicated from the shaft $B^2$ by a pulley thereon through a belt, $o^5$, as shown in Fig. 3, to a pulley on the end of the shaft Z, before referred to as controlling the key-locking devices, &c. The last-mentioned shaft carries at one end a beveled pinion, $p^5$, which drives a corresponding pinion secured to the journal of the roll $a'$, driving the assembling or composing chain F. A second beveled pinion, $q^5$, on the same shaft, drives a beveled pinion on the shaft $f'$ of one of the rotary arms I. The pinion $g^5$, through which the distributer-plates are driven, is provided with a beveled driving-gear, $r^5$, which receives motion from a pinion on the upper end of a shaft, $s^5$, the lower end of which is in turn driven through a beveled pinion thereon, from a pinion on the worm-shaft $B^2$, motion being thus communicated from the worm-shaft directly to the distributing mechanism. It is desirable to have the motion of the distributer-plates cease whenever a line of matrices is exhausted—that is to say, when there are no more matrices in position to be transferred to the plates. For this reason I connect the driving-gear $r^5$ with the pinion-shaft $g^5$, through a clutch mechanism controlled by the yielding dog or finger $w^3$, against which the matrices act, as before mentioned, as shown in Figs. 12, 14, and 29. The gear-wheel $r^5$, which has constant motion and which turns loosely on the pinion-shaft, is provided on one side with a ratchet-wheel, $t^5$, designed to engage a pawl, $u^5$, having a side finger and pivoted to an arm, $v^5$, fixed to the pinion-shaft to communicate motion to the latter. The stopping and starting of the distributer is secured by throwing the pawl into and out of action, and this is accomplished by means of a non-rotating crown-wheel, $w^5$, fixed to a shaft, $x^5$, which slides in an axial direction, being urged constantly inward by a spring, $y^5$, bearing on its outer end. The pawl is acted upon by a spring, $z^5$, which tends constantly to cause its engagement with the ratchet-wheel. When the crown-wheel is moved backward to the position shown in Figs. 12 and 14, it has no effect on the other parts, the pawl remaining in engagement. When, however, the crown-wheel is moved inward, one or another of its teeth will pass beneath the finger of the pawl, which, riding thereon, will lift the pawl out of engagement with the ratchet-wheel $t^5$, which latter will continue its rotation, while the pawl and the pinion-shaft connected therewith will cease their motion. When the crown-wheel is again moved backward out of engagement with the projecting finger of the pawl, the latter will drop into engagement and immediately start the pinion. To effect the backward movement of the crown-wheel, which is, in fact, but a tripping device for the pawl, I connect to the shaft of the crown-wheel an arm, $a^6$, having an inclined or beveled face acted upon, as shown in Fig. 14, by an upright arm, $b^6$, secured to the rock-shaft $c^6$, which carries the finger $w^3$. Whenever the matrices bear against the arm $w^3$ it is forced backward, and its rock-shaft caused to operate the arm $b^6$, forcing the latter backward, so as to throw the crown-wheel out of the path of the pawl. A spring, $d^6$, attached to the arm $b^6$, tends to draw the same forward out of action, and also to hold the finger $w^3$ in the forward position.

It is desirable to provide for the continuous operation of the driving-shaft and the composing devices driven therefrom, while the clamping and casting devices are permitted to remain at rest during the proper intervals. To this end I adopt the construction shown in Fig. 33. The main shaft $B^2$ is divided transversely, so that the outer end may turn independently of the end which carries the worm. The adjacent ends are swiveled together and the inner end provided with a sliding non-rotating plate, $a^7$, having fingers $b^7$, which slide through a plate or collar to enter holes, or between teeth in a plate, $c^7$, fixed to the upper portion of the shaft. These devices constitute a clutch by which the two parts of the shaft may be locked together. A spring, $d^7$, holds the clutch in engagement when the parts are released. Their disengagement is effected by a hook, $e^7$, pivoted to the frame, as in Fig. 3, and extending forward in reach of the operator. This lever may be urged inward by a spring or otherwise to cause the engagement of the hook with the clutch. It may be urged outward at will by hand, and also, if desired, by a cam, $f^7$, on the upright shaft, this cam being so arranged that it will force the lever backward and cause the hook to disengage the clutch at the close of each casting operation after the printing-bar has been discharged. For the purpose of causing the engagement of the clutch automatically when the matrices are brought into position in front of the mold, I provide the frame, as shown in Fig. 3, with a lever, $g^7$, one end of which carries a pin to engage a clutch-operating hook, while the opposite end carries a rod, $h^7$, in position to be acted upon by the rod K, which transfers the matrices. When, therefore, the last-named rod is moved to the left to place the matrices in front of the mold, it will push the rod $h^7$ to the left and cause the lever $g^7$ to trip the hook or detent $e^7$, whereupon the driving-clutch will be thrown into action by the spring and the clamping and casting mechanisms set in motion. The form of the cam by which the throw-out lever is operated may be modified, or other appropriate mechanism may be substituted to cause the automatic disengagement of the parts at the proper time.

*Alarm mechanism and indicator.*—In operating the machine it is desirable to know at all times the aggregate width of the matrices for each line, in order that the operator may decide when to advance the same to the clamping and casting mechanism. To this end I provide the machine with an indicator actuated by the matrices, and also with an alarm actuated from the same source, so that when the assembled line is within a certain limit of the predetermined length audible notice will be given. The essence of the invention in this regard consists in making use of the matrices as a means of moving the indicator and of actuating the alarm, and the details to this end may be embodied in various forms which a reading of this specification will suggest to the skilled mechanic. Figs. 34 and 35 represent the preferred form of these devices. A finger, $b^8$, lies transversely across the rails D, so that as the matrices are advanced between the rails they will push the finger before them. The finger is fastened to one end of a horizontal rock-shaft, $c^8$, mounted in the upper end of a block, $d^8$, which slides horizontally on the side of the rails or other suitable support. The opposite end of this rock-shaft is provided with a gravitating hammer or striker, $f^8$, and with a finger, $e^8$, designed to engage a latch, $i^8$, by which the striker is held in an elevated position, the lower end of this latch being extended downward below its pivot, as shown. A bell, $g^8$, is mounted on a stationary standard, $h^8$, adjustably secured to the side of the main frame and provided below the bell with two horizontal arms, $k^8$ and $l^8$, designed to trip the latch $i^8$. A weighted cord, $m^8$, passing over a suitable guide, or in place of this cord a spring is attached to the slide $d^8$, and tends to move the slide and the parts carried thereon to the right. The parts stand normally in the position, represented in Fig. 35 with the striker elevated. As the matrices are forced into position, one after another, ahead of the pawls H, the one at the front of the line acts against the finger $b^8$ and pushes the same forward, thereby advancing the striker toward the bell. At the instant that the line of matrices has attained a suitable length the lower end of the latch $i^8$ encounters the arm $k^8$, and being tripped thereby it permits the striker to fall and sound the bell. The latch is provided, as shown, with a shoulder, against which the finger $e^8$ drops when the parts are tripped, as above. As the advance of the parts continues, the latch encounters the second arm, $l^8$, so that it entirely disengages the finger $e^8$, whereupon the striker $f^8$ drops to a pendent position, so that it may pass backward without encountering the bell, the rock-shaft being by the same action rotated so as to turn the finger $b^8$ to an upright position clear of the matrices, that they may be advanced over the rails. As the slide $d^8$ is returned by the weighted cord or spring to its original position, the outer or heel end of the finger $b^8$ encounters an inclined surface, $o^8$, on the side of the rail, whereby the finger is again turned down to the face of the rails, so as to act in front of the matrices assembled on the next line, this action being accompanied by the elevation of the striker and the re-engagement of the supporting-latch. The standard $h^8$ is dovetailed or otherwise attached to the frame, so that it may be adjusted longitudinally, and provided with set-screws or equivalent fastening devices to enable it to be placed in position to cause the alarm to be given, sooner or later, according to the length of the line of matrices to be assembled. In place of or in addition to this audible alarm I propose to make use of a visual indicator. A scale or series of graduations, $p^8$, may be formed on the top of the rails D, or on their side faces, and read either in connection with the finger $b^8$ or with a separate finger attached to and moved with the slide actuated by the matrices. A scale or indicator thus arranged will enable the operator to see at any instant the aggregate width of the matrices assembled in line, or, in other words, the exact length of the line, so that he may determine with certainty when to stop the addition of matrices or space-bars to the line. The finger $b^8$ serves not only the purpose hereinbefore referred to, but also the purpose of a resistant or pressure device, to oppose the advance of the matrices and hold them closely together during the course of composition or assemblage.

*Operation:* The machine being set in motion, with the carrier-chain F in constant and rapid rotation, the operator depresses, in the proper succession, the letters representing the characters which are to appear on the type-bar. The finger-keys, operating the escapement-keys C, cause the latter to transfer the matrices, one at a time, from the magazine-tubes to the rails D, along which they are carried, one after another, within reach of the rotary arms I, whereby they are forced forward between and beyond the pawls H, and assembled in a compact line. Whenever all the characters have been designated to complete a word, or when for any other reason it is desirable to have a space appear in the line, the space-key is operated, whereby the hook $d^4$ is caused to adjust one of the slides to trip the detent-lever $b^4$, which is followed almost immediately by the descent of the slide $m'$, which forces a space-bar down behind the matrix last added to the line. Additional matrices are then added to the line by the manipulation of the keys, and so on repeatedly until a sufficient number have been collected or assembled to produce a line, or until there are as many as are admissible within the space limited for the line. The rod K is then moved and the pawls H caused to advance the matrices to the shifting-rails J, the same operation starting the mechanism by which the clamps and attendant parts are actuated. The main clamp is immediately advanced behind the matrices, placing the lateral jaws or clamps opposite the ends of the line of matrices. At or about the time that the clamps close upon the matrices, the mold L is forced against the matrices from the opposite side, the spacing-bars forced upward by means of the plate P, and the mouth of the melting-pot in turn advanced against the rear side of the mold. The parts being now in position for casting, the pump is operated and the mold filled with metal, which, setting immediately, forms a printing-bar, the front edge of which bears in relief the letters or characters properly spaced or justified. The melting-pot is then retracted, the mold withdrawn from the matrices, and the clamps retracted, after which the mold makes a half-revolution, presenting the bar in front of the ejector $y^2$, by which the bar is driven from the mold and through the opening in the main clamp to the finger $z^2$, by which it is, at the proper time, turned over and added to the column in the galley. Immediately after the release of the matrices the shifting-rails on which they are suspended rise to their elevated position, and the slide S, being released, is urged forward by its spring, so as to force the matrices into the magazine. The finger $x^3$ lifts the matrices in succession to the top of the finger $w^3$, and between the open edges of the distributing-plates. As the plate advances the jaws close upon the matrices, which at the same time engage the rail $e^5$. The matrices are carried forward, one after another, and by the simultaneous opening of both pairs of jaws they are dropped into the appropriate tubes. As the matrices enter the distributing mechanism, the space-bars are dropped into the vertically-movable receiver, by which they are in due time lowered to the level of the supporting-rails N, to which they are transferred by the slide $e^6$.

Having thus described my invention, what I claim is—

1. In a machine for forming type-bars or matrices for type-surfaces, a melting pot or mold, a series of matrices, composing-fingers, and means, substantially as described, whereby the matrices assembled for one line may be maintained in position at an intermediate point, separated from those before and after them.

2. In a machine for producing type-bars or matrices, the composing-fingers, a series of matrices or dies, finger-keys, and mechanism, substantially as described, actuated by finger-keys for delivering the matrices to the composing mechanism.

3. In combination with a continuously-operating composing mechanism and a series of matrices or dies, rails or guides to receive successive lines of matrices, and means, substantially as described, whereby one line may be advanced upon said guides away from those following after, thus permitting the separate groups or lines of matrices to be kept distinct from each other.

4. In a machine for forming type-bars, a series of matrices having letters or characters in positive form therein, and mechanism, substantially as described, for assembling said matrices in line with their characters in view of the operator, whereby he is enabled to inspect the line previous to its delivery to subsequently-acting mechanism, to the end that errors therein may be corrected.

5. The matrix formed with the suspending-shoulders $b$, and reduced in width above the same to produce the shoulders $c$ and $d$.

6. The matrix provided with the suspending-shoulders $b$, upper shoulders $c$, and an undercut notch in the upper end.

7. The matrix-plate provided with the sustaining or suspending shoulders at the top and with an intaglio character in one of its vertical edges.

8. The matrix provided with suspending-shoulders at its upper end and with the notch or shoulder $f$ in the lower end, substantially as and for the purpose described.

9. The series of matrix-plates provided with sustaining-shoulders $b$, of uniform size, and with upper shoulders, $c c d d$, differing in the extent of their separation in matrices representing different characters.

10. In a mechanism for assembling and distributing matrices, a series of upright magazine-tubes grouped closely together in line at their lower ends, but separated at their upper ends, substantially as and for the purposes described.

11. In a mechanism for assembling and distributing matrices, the series of upright magazine-tubes closely assembled in line at their lower ends, but separated and provided with expanded mouths at their upper ends.

12. In a magazine for matrices, the combination of the two vertical plates, each provided with grooves arranged in pairs, brought together at the upper and lower ends, but separated at intermediate points, with intermediate division-plates seated therein, whereby two partitions are permitted between each matrix tube or passage and the next, and the tubes separated toward their upper ends.

13. The magazine-tubes, in combination with automatic periodically-actuated detents common to the series of tubes, whereby the matrices are released, so that they may escape when free from resistance thereunder.

14. The magazine tubes and the automatic periodically-actuated dogs or detents to release the matrices therefrom, in combination with finger-keys and escapement-keys actuated by the finger-keys and provided with dogs or detents to receive the matrices from the magazine and carry them positively downward.

15. In combination with a magazine to hold the matrices one upon another, detents or dogs to engage the bottom matrix and retain the same in the magazine, and a vertically-movable key or receiver located beneath the mouth of the magazine and provided with automatic dogs or detents to receive and hold the matrix as it falls from the magazine, and then discharge the same downward as the key descends.

16. The magazine to hold the matrices one above another, and the fixed rails to sustain the matrices as they are discharged from the magazine, in combination with the dogs $i\ i'$, to hold the matrices in the magazine, and the vertically-movable escapement-keys C, provided with automatic dogs to receive the matrices and transfer them positively one at a time to the rails.

17. In a mechanism for assembling matrices, the stationary parallel rails to sustain the matrices and the endless belt provided with fingers to advance the matrices successively to one end of the rails.

18. In combination with the matrix-sustaining rails, the endless belt provided with yielding spring-supported fingers to advance the matrices.

19. The combination, substantially as described and shown, of the magazine-tubes, the periodically-actuated dogs or detents to retain the matrices therein, the escapement-keys to transfer the matrices to the assembling mechanism, and the automatic device to prevent the descent of the keys during regular intervals and to hold down in the meantime those keys which have been already depressed.

20. In combination with the escapement-keys to transfer the matrices, the automatic rising and falling bar to lift the keys to their normal positions.

21. In combination with the traveling assembling devices, the escapement-keys to deliver the matrices thereto, and the springs to sustain the keys normally in an elevated position, whereby collision between the descending and the laterally-moving matrices is prevented.

22. In combination with the matrix-sustaining rails and the conveying or assembling belt, the rotary arms I, to advance the matrices one at a time as they are presented by the belt.

23. In combination with the matrix-sustaining rails, the pawls and the sliding support for the pawls, whereby they may be moved lengthwise of the rails to advance the assembled matrices.

24. In combination with horizontal matrix-supports and a carrier to advance the matrices thereover, the constantly-rotating arms to advance the matrices and the pawls to engage the matrices as they are delivered thereto by the arms.

25. In combination with horizontal rails or supports whereon the matrices are advanced and assembled in line, a series of independent space-bars and overhead devices, substantially as described, for dropping said bars one at a time into the accumulating line of matrices.

26. The stationary rails D, adapted to sustain the matrices, in combination with the elevated rails N, adapted to sustain the space-bars in position to descend therefrom to the lower rails, whereby the matrices are permitted to pass beneath the space-bars and the latter permitted to descend to the stationary rails between the matrices.

27. In combination with the space bar supports N, the vertically-reciprocating slide adapted to engage the space-bars and transfer them one at a time to the line of assembled matrices.

28. In combination with the space-bars, their sustaining-rails, and the slide $m'$, the spring to depress the slide and the cam to elevate the same.

29. The slide $m'$, to deliver the space-bars, its depressing-spring, its elevating-cam, and the detent-lever $b^4$, to prevent the descent of the slide, in combination with the roller, the slide thereon to trip the detent-lever, and the slide-adjusting device connected with the space-key, whereby the depression of the key causes the slide to trip the detent and permit the slide $m'$ to add a space-bar to the line of matrices.

30. In combination with matrices having side shoulders or projections, sustaining-rails longitudinally grooved to embrace the matrices and prevent them from tipping edgewise.

31. In combination with the matrices and their sustaining rails, the clamp to act on the edges of the aligned matrices, and the two jaws movable therewith, and also movable to and from each other, whereby the matrices may be confined against each other and against the mold.

32. In combination with the matrices and a support to sustain them in line when assembled or composed, two clamping jaws movable to and from each other to act endwise on the line of matrices, and a support for said jaws movable at right angles to the line, whereby the jaws may be moved back out of the path of the matrices to admit of their being moved into and out of position.

33. In combination with the matrices and a support therefor, the reciprocating clamp O, the sliding jaws $a^2$, and the screw $d^2$.

34. In combination with the matrices and devices, substantially as described, to sustain the same in line, the rotary mold movable to and from the matrices, and the melting-pot movable to and from the mold.

35. The rotary mold, the matrices, and mechanism, substantially as described, for filling the mold, in combination with the ejector and operating devices, substantially as described, for presenting the mold to the matrices and the ejector alternately.

36. In combination with the independent matrices and their supporting-rails, the rotary mold movable to and from the matrices, the melting-pot movable to and from the mold, the clamping devices movable to and from the matrices, and mechanism, substantially as described, for operating said parts, as set forth.

37. In an organized machine for producing type-bars, and in combination with a mold and a melting-pot which alternately meet and separate, a rotary wiper, substantially as described.

38. In combination with the independent matrices and supporting-rails for the selected and aligned matrices, the clamp O, the jaws $a^2$, to confine the matrices laterally, the space-bars, and the plate P, to advance the space-bars simultaneously, whereby the line is expanded or elongated to fill the predetermined space between the jaws $a^2$.

39. The reciprocating clamp O, having the jaws $a^2$ and plate P, both mounted thereon, whereby the jaws are carried into position to confine the matrices at the same time that the plate is placed in position to cause their spreading action.

40. The movable clamp O, the rotary mold, the reciprocating plate on which the mold-shaft is mounted, and the movable melting-pot, in combination with the single shaft and its cam-wheels for imparting motion to the above-named parts, as described and shown.

41. In combination with the rails J, to sustain the aligned matrices, the sliding clamp O, provided with a lip, $a^9$, to engage the rails, substantially as described and shown, whereby the rails and matrices are brought with certainty to the proper positions.

42. In combination with the jaws $a^2$, to confine the aligned matrices laterally, the screw to actuate the same, the reciprocating bar $e^2$, having a constant length of movement, and the adjustable connection between the bar and the screw, whereby the jaws may be caused to stop at a greater or less distance apart, according to the length of the bar to be produced.

43. In combination with mechanism, substantially as described, for delivering the type-bars thereto, a galley or receiver and the pivoted vibratory finger $z^2$, whereby the bars are delivered one upon another in the galley.

44. In combination with the turning delivery-finger, the galley and devices, substantially such as shown, securing the galley to the frame and permitting its instant removal when filled.

45. In a machine for producing type-bars, and in combination with means, substantially as described, for delivering the bars thereto, the upright galley or receiver hinged in place, so that it may be turned upward to permit convenient inspection of the matter therein.

46. In combination with casting and clamping mechanisms and an elevated distributing mechanism, substantially as described, matrix-sustaining rails J, secured to a vertical sliding guide and adapted to reciprocate, as described, directly between the casting and distributing mechanisms.

47. A mechanism for carrying a matrix to a predetermined point and there depositing it, consisting of a traveling carrier provided with two opposing dogs or jaws to engage opposite sides of the matrix, and cams to open said jaws when they reach the proper point of discharge.

48. In a mechanism for distributing matrices having necks of different widths, the combination of traveling plates or carriers, spring-actuated dogs or jaws in said carriers to engage the edges of the matrices, and a series of stationary cams to cause the opening of the jaws at different points in their course of movement, whereby the respective matrices are discharged at different points.

49. A series of matrices each having two or more necks and each matrix differing in the width of one or both of its necks from those bearing different characters, in combination with traveling plates or characters provided with spring-actuated dogs or clamps to engage independently the two necks of the matrices, and a series of stationary cams distributed along the path of the carrier and adapted, as described and shown, to open the dogs which hold each matrix simultaneously at the point where the matrix is to be distributed.

50. In a matrix-distributing mechanism, the series of plates V, traveling in an endless course, in combination with the dogs $c c$ and $d d$, arranged in pairs, as described, the springs to close said dogs upon the matrices, and the series of stationary cams $c^5$ and $d^5$, substantially as described and shown.

51. In a distributing mechanism, and in combination with matrices differing from each other in dimensions, traveling plates or carriers provided with a plurality of pairs of dogs to engage a single matrix, and means, substantially as described, to disengage all the dogs which hold each matrix at a predetermined point.

52. In combination with a series of matrices having undercut or dovetailed notches in their upper ends, differing in size in the respective matrices, a sustaining rail or bar, varying in width at different points, substantially as described, whereby the respective matrices are released at different points.

53. In combination with matrices, substantially such as described and shown, a suspending rail or bar, $e^5$, of varying width, traveling spring-actuated dogs to engage and carry the matrices, and cams to open the dogs at particular times in the course of their travel.

54. In combination with the independent matrices and the traveling carriers provided with spring-actuated dogs to engage the matrices, the cams to open all the dogs, and a reciprocating finger to pass the matrices one at a time between the dogs.

55. In combination with the matrix-sustaining rails T and the slide S, to urge the matrices constantly forward thereon, the finger $x^3$, to elevate the matrices one at a time, the device $w^3$, to momentarily sustain the elevated matrices, the traveling plates provided with spring-actuated dogs to engage the matrices, and the cams to open the dogs for the admission of the matrices, substantially as described, whereby the matrices are separated and delivered independently to the carrier preparatory to their distribution.

56. In combination with the traveling plates V, provided with matrix-carrying dogs, the finger $x^3$, to place the matrices in the grasp of the dogs, and the cam-wheel to actuate said finger, connected by gearing with the plates, whereby the action of the finger is insured at the proper instant with respect to the position of the dogs.

57. The traveling distributer-plates U, in combination with the driving-clutch and intermediate gear, and the yielding clutch-controlling finger $w^3$, adapted to be moved by the matrices, whereby the distributer-plates are caused to stop when the supply of matrices is exhausted.

58. In combination with the sustaining-rails and the matrices adapted to be suspended thereby, the space-bars of a width less than the matrices, adapted to descend between the rails, whereby the space-bars may be dropped from the line without releasing the matrices.

59. In combination with the matrices and space-bars differing in width and the distributing mechanism, substantially as described, to deliver the matrices at different points, matrix-sustaining rails located in advance of the distributer and adapted, as described, to permit the descent of the space-bars between them, whereby the space-bars are released previous to the presentation of the matrices to the distributing devices.

60. In combination with the vertically-movable rails J, to sustain the matrices and space-bars, the receiving-rails T, the spring-actuated slide S, and means, substantially as described, for positively retracting said slide before the rails J complete their ascent, whereby the matrices are transferred to and urged constantly forward upon the rails T, that they may be passed to the distributing devices.

61. In combination with the devices for delivering the space-bars thereto, the vertically-movable carrier, the lower supports, N, and the device for transferring the bars from the carrier to said supports.

62. In combination with the casting and clamping mechanisms, and their driving-clutch, substantially as described, pawls or carriers H, to transfer the previously-aligned matrices to the clamping and casting devices, and a pawl-carrier, K, arranged to actuate the driving-clutch, substantially as described, whereby the action of transferring the matrices is caused to start the clamping and casting mechanism.

63. The series of magazine-tubes having their upper ends arranged in line, in combination with an endless chain carrying dogs or clamps to sustain the matrices over the entire series of tubes, and means, substantially as described, to open the dogs at predetermined points, and thus drop the matrices into the tubes.

64. In an organized machine for producing type-bars, the combination, substantially as hereinbefore described, of the following elements: the independent matrices, the magazine to contain the matrices, the finger-keys and their connections, substantially as described, to effect the discharge of the matrices one at a time from the magazine, the composing mechanism to assemble or align the matrices discharged from the magazine, the casting mechanism embracing the force-pump, the mold, and the melting-pot, the automatic clamping mechanism to confine the matrices against the mold, mechanism, substantially as shown, to elevate the matrices from the mold to the distributing mechanism, and a distributing mechanism, substantially as described, for returning the matrices to the magazines.

65. In combination with the guide-rails and a series of matrices arranged to move thereon, a stationary scale adjacent to said guide and a finger adapted to be advanced by the action of the type over said scale, said finger mounted, substantially as described, that it may be moved out of the path of the type to permit their advance at the completion of the assembling or composing operation.

66. In a distributing mechanism, a matrix-carrier provided with a clamp to engage the matrix at one edge, in combination with a cam to cause the opening of said clamp at a predetermined point.

67. In combination with rails or guides for the aligned matrices, a yielding finger to resist their advance, and automatic locking mechanism, substantially as described, to prevent their retrograde motion, whereby the matrices are held in compact form as they are assembled.

68. In combination with the matrix and guides therefor, the yielding finger extending transversely of the guides at an intermediate point in their length, to resist the advance of the matrices, and movable from the path of the matrices, substantially as described, whereby the matrices may be permitted to continue their advance in the guides beyond the finger.

69. In combination with the stationary bell, the sliding support having the finger $b^8$, the striker, and the detent thereon, the stationary trip-arm to release the detent, and means, substantially as described, for advancing the matrices against the finger.

70. In combination with the series of matrices or dies, guide-rails along which said dies may be moved, and a scale or series of graduations located upon or adjacent to said rails at an intermediate point in their length, whereby the operator is enabled to determine the aggregate width of the dies in the course of their assemblage or composition and before advancing them to the end of the rail.

In testimony whereof I hereunto set my hand, this 5th day of May, 1885, in the presence of two attesting witnesses.

OTTMAR MERGENTHALER.

Witnesses:
 MILTON WHITE JOHNSON,
 HORACE LINCOLN BEALL.